United States Patent
Jeong et al.

(10) Patent No.: US 9,015,751 B2
(45) Date of Patent: Apr. 21, 2015

(54) IMAGE DISPLAY DEVICE AND METHOD FOR OPERATING SAME

(75) Inventors: Young Ho Jeong, Seoul (KR); Eun Hee Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 96 days.

(21) Appl. No.: 13/643,982

(22) PCT Filed: Apr. 27, 2010

(86) PCT No.: PCT/KR2010/002654
§ 371 (c)(1),
(2), (4) Date: Feb. 5, 2013

(87) PCT Pub. No.: WO2011/136402
PCT Pub. Date: Nov. 3, 2011

(65) Prior Publication Data
US 2013/0152138 A1    Jun. 13, 2013

(30) Foreign Application Priority Data

Apr. 27, 2010    (KR) .......................... 10-2010-0038937

(51) Int. Cl.
H04N 5/445        (2011.01)
H04N 21/482       (2011.01)
(Continued)

(52) U.S. Cl.
CPC ............ *H04N 21/482* (2013.01); *G06F 3/0346* (2013.01); *G06F 3/0482* (2013.01);
(Continued)

(58) Field of Classification Search
CPC ................ H04N 21/444227; H04N 21/44231; H04N 21/2743; H04N 21/4788; H04L 67/104
See application file for complete search history.

(56) References Cited

U.S. PATENT DOCUMENTS 6,154,209 A     11/2000 Naughton et al.
7,886,327 B2 *   2/2011 Stevens .......................... 725/105
(Continued)

FOREIGN PATENT DOCUMENTS

CN      101677374       3/2010
EP      1827016         8/2007
(Continued)

OTHER PUBLICATIONS

The State Intellectual Property Office of the People's Republic of China Application Serial No. 201080066500.5, Office Action dated Dec. 25, 2014, 5 pages.

(Continued)

*Primary Examiner* — Pankaj Kumar
*Assistant Examiner* — Timothy Newlin
(74) *Attorney, Agent, or Firm* — Lee, Hong, Degerman, Kang & Waimey

(57) ABSTRACT

The present invention relates to an image display device and to a method for operating same. The method for operating the image display device according to one embodiment of the present invention includes: replaying content; when a command for storing the replayed content exists, storing at least one portion of the replayed content; displaying a content object indicating the stored content; displaying objects indicating another user or electric device for an accessed network or another network linked to the accessed network; and, when a content object is dragged and dropped in a selected object among the objects indicating the other user or electronic device, transmitting content corresponding to a selected object and having been selected by a user or stored in a selected electronic device. Therefore, the present invention can enhance use convenience for users.

20 Claims, 26 Drawing Sheets

(51) Int. Cl.

| | |
|---|---|
| *G06F 3/0346* | (2013.01) |
| *G06F 3/0482* | (2013.01) |
| *G06F 3/0486* | (2013.01) |
| *H04H 20/08* | (2008.01) |
| *H04N 21/4147* | (2011.01) |
| *H04N 21/4788* | (2011.01) |
| *H04N 21/472* | (2011.01) |
| *H04N 21/63* | (2011.01) |

(52) U.S. Cl.
CPC ............ *G06F 3/0486* (2013.01); *H04H 20/08* (2013.01); *H04N 21/4147* (2013.01); *H04N 21/4788* (2013.01); *H04N 21/47202* (2013.01); *H04N 21/632* (2013.01)

(56) References Cited

U.S. PATENT DOCUMENTS

| | | | |
|---|---|---|---|
| 7,975,062 B2 * | 7/2011 | Krikorian et al. | 709/231 |
| 7,987,492 B2 * | 7/2011 | Liwerant et al. | 725/115 |
| 8,079,053 B2 * | 12/2011 | Yampanis et al. | 725/93 |
| 8,132,111 B2 * | 3/2012 | Baron et al. | 715/753 |
| 8,386,935 B2 * | 2/2013 | van Zwol et al. | 715/723 |
| 2002/0056123 A1 * | 5/2002 | Liwerant et al. | 725/87 |
| 2005/0246752 A1 * | 11/2005 | Liwerant et al. | 725/109 |
| 2005/0267876 A1 | 12/2005 | Watanabe et al. | |
| 2006/0048184 A1 * | 3/2006 | Poslinski et al. | 725/45 |
| 2006/0101499 A1 * | 5/2006 | Aravamudan et al. | 725/86 |
| 2007/0220024 A1 | 9/2007 | Putterman et al. | |
| 2007/0288970 A1 * | 12/2007 | Tedenvall | 725/86 |
| 2008/0134258 A1 * | 6/2008 | Goose et al. | 725/91 |
| 2008/0155628 A1 * | 6/2008 | Soukup et al. | 725/110 |
| 2008/0165153 A1 * | 7/2008 | Platzer et al. | 345/173 |
| 2008/0178242 A1 * | 7/2008 | Eyal et al. | 725/115 |
| 2008/0307324 A1 | 12/2008 | Westen et al. | |
| 2009/0111378 A1 * | 4/2009 | Sheynman et al. | 455/41.1 |
| 2009/0150947 A1 * | 6/2009 | Soderstrom | 725/93 |
| 2009/0254948 A1 * | 10/2009 | Middleton et al. | 725/62 |
| 2010/0036854 A1 * | 2/2010 | Regan et al. | 707/10 |
| 2010/0070899 A1 * | 3/2010 | Hunt et al. | 715/769 |
| 2010/0262911 A1 * | 10/2010 | Kaplan et al. | 715/719 |
| 2010/0303440 A1 * | 12/2010 | Lin et al. | 386/241 |
| 2010/0309119 A1 * | 12/2010 | Yi et al. | 345/157 |
| 2011/0078717 A1 * | 3/2011 | Drummond et al. | 725/14 |
| 2011/0083157 A1 * | 4/2011 | Addair | 725/120 |
| 2011/0099594 A1 * | 4/2011 | Chen et al. | 725/105 |
| 2011/0107369 A1 * | 5/2011 | O'Brien et al. | 725/38 |
| 2011/0126241 A1 * | 5/2011 | Beattie et al. | 725/62 |
| 2012/0242776 A1 * | 9/2012 | Tucker et al. | 348/14.03 |

FOREIGN PATENT DOCUMENTS

| | | |
|---|---|---|
| EP | 2151994 | 2/2010 |
| JP | 2002-132618 | 5/2002 |
| JP | 2003-323387 | 11/2003 |
| JP | 2005-346202 | 12/2005 |
| WO | 01/99033 | 12/2001 |

OTHER PUBLICATIONS

Hewlett-Packard Company, "HP Media Center PC User's Guide," XP002378322, Jan. 2003, 168 pages.

European Patent Office Application Serial No. 10850770.8, Search Report dated Oct. 30, 2013, 14 pages.

PCT International Application No. PCT/KR2010/002654, Written Opinion of the International Searching Authority dated Apr. 27, 2010, 3 pages.

\* cited by examiner (a)  (b)

IMAGE DISPLAY DEVICE AND METHOD FOR OPERATING SAME

CROSS-REFERENCE TO RELATED APPLICATIONS

This application is the National Stage filing under 35 U.S.C. 371 of International Application No. PCT/KR2010/002654, filed on Apr. 27, 2010, which claims the benefit of earlier filing date and right of priority to Korean Patent Application No. 10-2010-0038937, filed on Apr. 27, 2010, the contents of which are all hereby incorporated by reference herein in their entirety.

TECHNICAL FIELD

The present invention relates to an image display device and a method for operating the same and, more particularly, to an image display device capable of improving the convenience of a user and a method for operating the same.

BACKGROUND ART

An image display device is an apparatus having a function of displaying an image that may be watched by a user. The user may watch broadcasting through the image display device. The image display device displays broadcasting selected by the user among broadcasting signals transmitted from a broadcasting station on a display. Broadcasting currently tends to be changed from analog broadcasting into digital broadcasting.

Digital broadcasting means broadcasting of transmitting a digital image and a voice signal. The digital broadcasting is stronger against external noise than the analog broadcasting so that loss of data is small, that it is advantages to correcting errors, that resolution is high, and that a clear screen is provided. In addition, unlike in the analog broadcasting, a bidirectional service may be provided in the digital broadcasting.

TECHNICAL PROBLEM

An aspect of the present invention provides an image display device capable of improving the convenience of a user and a method for operating the same.

In particular, another aspect of the present invention provides an image display device capable of easily transmitting replayed content to a user who accesses a network or to another electronic device and a method for operating the same.

On the other hand, still another aspect of the present invention provides an image display device capable of changing an amount of transmitted content data in accordance with a network access state and a method for operating the same.

In addition, still another aspect of the present invention provides an image display device capable of providing various user interfaces and a method for operating the same.

TECHNICAL PROBLEM

According to aspects of the present invention, there is provided a method for operating an image display device, including replaying content, storing at least one portion of the replayed content when a storage command on the replayed content exists, displaying a content object indicating the stored content, displaying an object indicating the other users or the other electronic devices of an accessed network or the other networks linked to the accessed network, and transmitting the stored content to a selected user or a selected electronic device corresponding to the selected object when the content object is dragged to be dropped to an object selected from the object indicating the other users or the other electronic devices.

There is provided an image display device, including a display unit, a network interface unit to transmit data to or receiving data from a network, a storage unit to store at least one portion of replayed content when a content storage command exists when content is replayed, and a controller to control the display unit to display a content object indicating the stored content, controlling the display unit to display an object indicating the other users or the other electronic devices of the accessed network or the other networks linked to the accessed network, and controlling the display unit to transmit the stored content to a selected user or a selected electronic device corresponding to a selected object when the content object is dragged to be dropped to the selected object of an object indicating the other users or the other electronic devices.

ADVANTAGEOUS EFFECTS

According to embodiments of the present invention, when content is replayed, a portion of the replayed content is stored and the stored content may be easily transmitted to the other users who access a network or to the other electronic devices. Therefore, the convenience of the user is improved.

In particular, during storing the content, the content may be easily stored by executing an application for storing the content.

On the other hand, during storing the content, content data replayed before a storage command as well as content data replayed from the start of the storage command to the end of the storage command is stored so that it is reflected when the user missed the storage point of a desired section.

On the other hand, an object indicating that a portion of replayed content is stored or an object indicating the amount of the stored content is displayed so that the user may intuitively recognize the storage state of the corresponding content.

On the other hand, network access sates of the other users or the other electronic devices are displayed so that the network access states may be easily grasped and the amount of content data to be transmitted may vary in accordance with the network access state or the amount of stored content so that transmission may be effectively performed.

In addition, predetermined content may be selected from a content list other than the stored content so that content desired by the user may be easily transmitted.

A desired application is selected using a remote controlling apparatus in a state where an application list in the image display device is displayed so that an application desired by the user may be conveniently executed.

On the other hand, various user interfaces may be provided in the image display device so that the convenience of the user may be increased.

BEST MODES

Hereinafter, the present invention will be described in detail with reference to the drawings.

Suffixes "module" and "unit" for the components used in the following description are provided in order to facilitate the preparation of the specification and do not provide particularly important meanings or functions in itself. Therefore, the "module" and "unit" may be mixedly used.

On the other hand, the image display device described in the present specification is an intelligent image display device in which a computer supporting function is added to a broadcasting receiving function. The image display device is faithful to the broadcasting receiving function and has an Internet function so that the image display device may have conveniently used interfaces such as a handwriting method inputting apparatus, a touch screen, or a space remote controller. Since a wired or wireless Internet function is supported, the image display device may access the Internet and a computer to perform an e-mailing, web browsing, banking, or gaming function. In order to perform such various functions, a standardized general-purpose operating system (OS) may be used.

That is, in the image display device described in the present invention, since various applications may be freely added to or deleted from a general-purpose OS kernel, user friendly various functions may be performed. For example, the image display device may be a smart TV.

Figure 1:
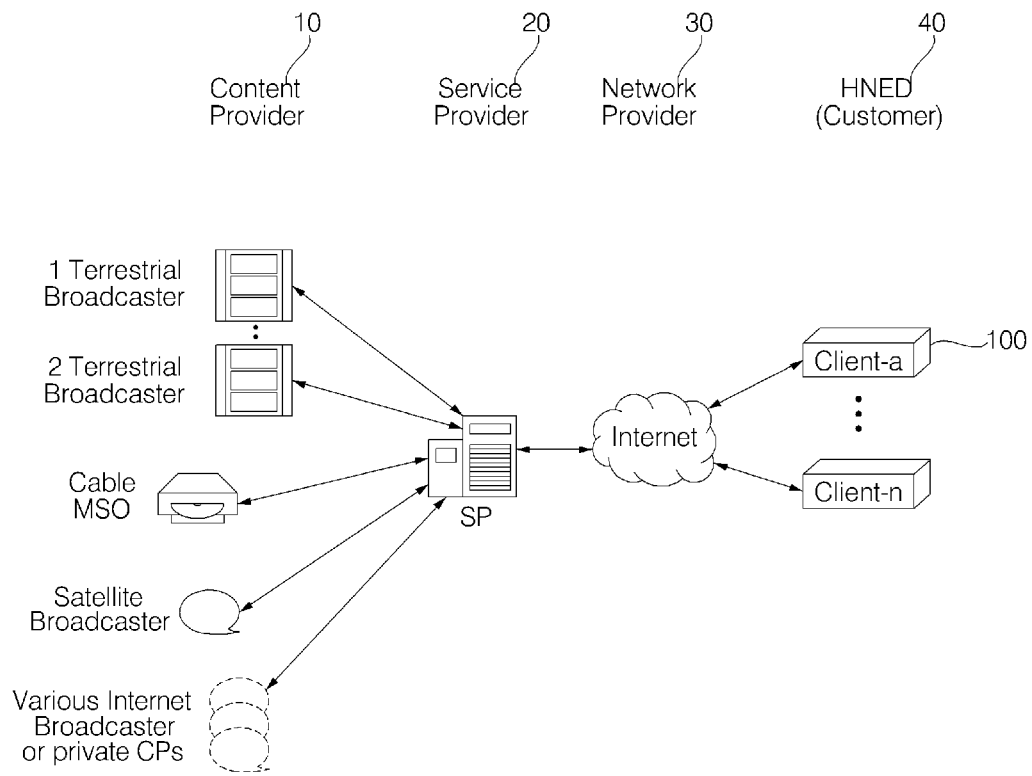
FIG. 1 is a view schematically illustrating an image display device system according to an embodiment of the present invention.

FIG. 1 is a view schematically illustrating an image display device system according to an embodiment of the present invention.

Referring to FIG. 1, the image display device system according to the embodiment of the present invention may be divided into a content provider (CP) 10, a service provider (SP) 20, a network provider (NP) 30, and a customer 40.

The CP 10 manufactures various contents to provide the manufactured contents. As illustrated in FIG. 1, the CP 10 may be, for example, a terrestrial broadcaster, a cable system operator (SO) or a cable multiple system operator (MSO), a satellite broadcaster, and an Internet broadcaster.

In addition, the CP 10 may provide various applications other than broadcasting contents, which will be described later with reference to FIG. 5.

The SP 20 makes contents provided by the CP 10 a service package to provide the service package. For example, the SP 20 of FIG. 1 makes first terrestrial broadcasting, second terrestrial broadcasting, the cable MSO, satellite broadcasting, various Internet broadcastings, and applications a package to provide the package to the customer.

On the other hand, the SP 20 may provide a service to the customer 40 using a unicast or multicast method. In the unicast method, data is transmitted one to one from one transmitter to one receiver. For example, in the unicast method, when a receiver requests a server for data, the server may transmit the data to the receiver. In the multicast method, data is transmitted to a plurality of receivers of a specific group. For example, the server may simultaneously transmit the data to a plurality of previously registered receivers. For such multicast registration, an Internet group management protocol (IGMP) may be used.

The NP 30 may provide a network for providing a service to the customer 40. The customer 40 may establish a home network end user (HNED) to receive a service.

In the above-described image display device system, conditional access or content protection may be used as means for protecting transmitted content. As an example of the conditional access or the content protection, a cable card and a downloadable conditional access system (DCAS) may be used.

On the other hand, the customer 40 may provide content through a network. In such a case, unlike in the above, to the contrary, the customer 40 may be a content provider and the CP 10 may receive content from the customer 40. Therefore, a bidirectional content service or data service may be provided.

Figure 2:
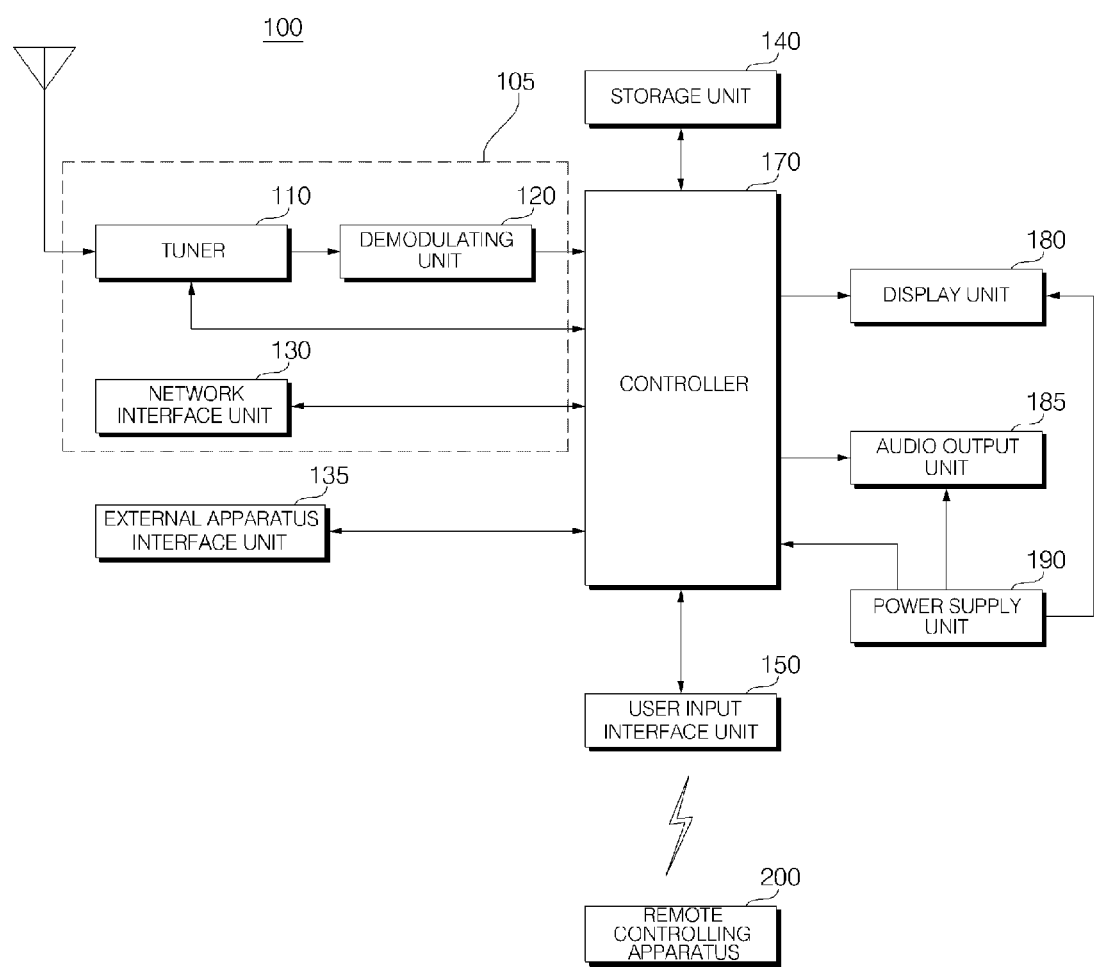
FIG. 2 is a block diagram illustrating the inside of the image display device according to the embodiment of the present invention.

FIG. 2 is a block diagram illustrating the inside of the image display device according to the embodiment of the present invention.

Referring to FIG. 2, an image display device 100 according to an embodiment of the present invention may include a broadcasting receiving unit 105, an external apparatus interface unit 135, a storage unit 140, a user input interface unit 150, a controller 170, a display unit 180, an audio output unit 185, and a power supply unit 190. The broadcasting receiving unit 105 may include a tuner 110, a demodulating unit 120, and a network interface unit 130. The tuner 110 and the demodulating unit 120 may be selectively provided together with the network interface unit 130.

The tuner 110 selects radio frequency (RF) broadcasting signals corresponding to channels selected by a user or all of the previously stored channels among the RF broadcasting signals received through an antenna. In addition, the tuner 110 converts the selected RF broadcasting signals into intermediate frequency signals, base band images, or voice signals.

For example, the selected RF broadcasting signals are converted into digital IF signals (DIF) when the selected RF broadcasting signals are digital broadcasting signals and are converted into analog base band images or voice signals (CVBS/SIF) when the selected RF broadcasting signals are analog broadcasting signals. That is, the tuner 110 may process digital broadcasting signals or analog broadcasting signals. The analog base band images or voice signals (CVBS/SIF) output from the tuner 110 may be directly input to the controller 170.

In addition, the tuner 110 may receive RF broadcasting signals of a single carrier in accordance with an advanced television system committee (ATSC) method or RF broadcasting signals of a plurality of carriers in accordance with a digital video broadcasting (DVB) method.

On the other hand, the tuner 110 sequentially selects the RF broadcasting signals of all of the stored broadcasting channels through a channel memorizing function among the RF broadcasting signals received through the antenna to convert the selected RF broadcasting signals into the intermediate frequency signals, the base band images, or the voice signals.

The demodulating unit 120 receives the digital IF signals DIF converted by the tuner 110 to demodulate the received DIF signals.

For example, when the DIF signals output from the tuner 110 are in the ATSC method, the demodulating unit 120 performs 8-vestigal side band (VSB) demodulation. In addition, the demodulating unit 120 may perform channel decoding.

For this purpose, the demodulating unit 120 may include a trellis decoder, a deinterleaver, and a reed Solomon decoder to perform trellis decoding, deinterleaving, and reed Solomon decoding.

For example, when the DIF signals output from the tuner 110 are in the DVB method, the demodulating unit 120 performs coded orthogonal frequency division modulation (COFDMA) demodulation. In addition, the demodulating unit 120 may perform channel decoding. For this purpose, the demodulating unit 120 may include a convolution decoder, the deinterleaver, and the reed Solomon decoder to perform convolution decoding, deinterleaving, and reed Solomon decoding.

The demodulating unit 120 may output a transport stream (TS) after performing demodulation and channel decoding. At this time, the TS may be a signal obtained by multiplexing an image signal, a voice signal, and a data signal. For example, the TS may be an MPEG-2 TS obtained by multiplexing an image signal of an MPEG-2 protocol and a voice signal of a Dolby AC-3 protocol. Specifically, the MPEG-2 TS may include a header of 4 bytes and a payload of 184 bytes.

On the other hand, the above-described demodulating unit 120 may be separately provided in accordance with the ATSC method and the DVB method. That is, an ATSC demodulating unit and a DVB demodulating unit may be provided.

The TS output from the demodulating unit 120 may be input to the controller 170. The controller 170 outputs an image to the display unit 180 and outputs voice to the audio output unit 185 after performing demultiplexing and image/voice signal processing.

The external apparatus interface unit 135 may connect an external apparatus to the image display device 100. For this purpose, the external apparatus interface unit 135 may include an A/V inputting and output unit (not shown) or a wireless communication unit (not shown).

The external apparatus interface unit 135 may be wiredly/wirelessly connected to an external apparatus such as a digital versatile disk (DVD), Blu-ray, a game device, a camera, camcorder, and a computer (a lap-top computer). The external apparatus interface unit 135 transmits an image, voice, or a data signal input from the outside through the connected external apparatus to the controller 170 of the image display device 100. In addition, the image, the voice, and the data signal processed by the controller 170 may be output to the connected external apparatus. For this purpose, the external apparatus interface unit 135 may include the A/V inputting and output unit (not shown) or the wireless communication unit (not shown).

The A/V inputting and output unit may include a USB terminal, a composite video banking sync (CVBS) terminal, a component terminal, an S-video terminal (analog), a digital visual interface (DVI) terminal, a high definition multimedia interface (HDMI) terminal, an RGB terminal, and a D-SUB terminal to input the image and the voice signal of the external apparatus to the image display device 100.

The wireless communication unit may perform short range wireless communication with another electronic device. The image display device 100 may be a network accessed to another electronic device in accordance with a communication protocol such as Bluetooth, radio frequency identification (RFID), infrared data association (IRDA), ultra wideband (UWB), ZigBee, and digital living network alliance (DLNA).

In addition, the external apparatus interface unit 135 is connected to various set top boxes through at least one of the above-described various terminals to perform input/output operations together with the set top box.

On the other hand, the external apparatus interface unit 135 receives applications in an adjacent external apparatus or an application list to transmit the received applications or application list to the controller 170 or the storage unit 140.

The network interface unit 130 provides an interface for connecting the image display device 100 to a wired/wireless network including the Internet network. The network interface unit 130 may include an Ethernet terminal for access to the wired network. Communication protocols such as wireless LAN (WLAN) (Wi-Fi), wireless broadband (Wibro), world interoperability for microwave access (Wimax), high speed downlink packet access (HSDPA) may be used for access to the wireless network.

The network interface unit 130 may transmit data to or receive data from the other users or the other electronic devices through an accessed network or the other networks linked to the accessed network. In particular, partial content data stored in the image display device 100 may be transmitted to a user or an electronic device selected from users or electronic devices previously registered in the image display device 100.

On the other hand, the network interface unit 130 may access a predetermined web page through the accessed network or the other networks linked to the accessed network. That is, the network interface unit 130 may access the predetermined web page through the network to transmit data to or receive data from a corresponding server. The network interface unit 130 may receive contents or data provided by a content provider or a network operator. That is, the network interface unit 130 may receive contents such as a movie, an advertisement, a game, a video on demand (VOD), and a broadcasting signal provided by the content provider or the network provider and information related to the contents through the network. In addition, the network interface unit 130 may receive update information and update files of firmware provided by the network operator. In addition, the network interface unit 130 may transmit data items to the Internet, the content provider, or the network operator.

In addition, the network interface unit 130 may select a desired application from publically opened applications to receive the selected application through the network.

The storage unit 140 may store programs for processing and controlling signals in the controller 170 and may store signal processed images, voice, or data signals.

In particular, the storage unit 140 may store at least one portion of replayed content when a storage command on the replayed content exists. For example, when a storage command on a replayed moving picture exists, the storage unit 140 may store a portion of content from the corresponding command to a shutdown command. On the other hand, content before a predetermined period from the corresponding command may be also stored, which is for a case in which the user missed the storage point of time of a desired section. As described above, storing a partial period of the replayed content may be a clipping function.

In addition, the storage unit 140 may perform a function of temporarily storing the images, the voice, or the data signals input from the external apparatus interface unit 135 or the network interface unit 130. In addition, the storage unit 140 may store information on a predetermined broadcasting channel through a channel memorizing function.

In addition, the storage unit 140 may store the applications or the application list input from the external apparatus interface unit 135 or the network interface unit 130.

The storage unit 140 may include a storage medium of at least one type among a flash memory type memory, a hard disk type memory, a multimedia card micro type memory, a card type memory (for example, an SD or XD memory), a random access memory (RAM), and a read only memory (ROM) such as an electrically erasable programmable ROM (EEPROM). The image display device 100 may replay content files (a moving picture file, a still image file, a document file, and an application file) stored in the storage unit 140 to provide the replayed content files to the user.

In FIG. 2, the embodiment in which the storage unit 140 is separately provided from the controller 170 is illustrated. However, the range of the present invention is not limited to the above. The storage unit 140 may be included in the controller 170.

The user input interface unit 150 transmits signals input by the user to the controller 170 or transmits signals from the controller 170 to the user.

For example, the user input interface unit 150 may receive a user input signal or a control signal such as a power on/off signal, a channel selecting signal, and a screen setting signal from the remote controlling apparatus 200 to process the received user input signal or control signal or may transmit the control signal from the controller 170 to the remote controlling apparatus 200 in accordance with various communication methods such as an RF communication method and an IR communication method.

In addition, for example, the user input interface unit 150 may transmit a user input signal or a control signal input from a local key (not shown) such as a power key, a channel key, a volume key, and a set value to the controller 170.

In addition, for example, the user input interface unit 150 may transmit a user input signal or a control signal input from a sensing unit (not shown) for sensing a gesture of the user to the controller 170 or may transmit signals from the controller 170 to the sensing unit (not shown). Here, the sensing unit (not shown) may include a touch sensor, a voice sensor, a position sensor, and an operation sensor.

The controller 170 demultiplexes an input stream or processes demultiplexed signals through the tuner 110, the demodulating unit 120, or the external apparatus interface unit 135 to generate and output a signal for outputting an image or voice.

An image signal image processed by the controller 170 may be input to the display unit 180 to be displayed as an image corresponding to the corresponding image signal. In addition, the image signal image processed by the controller 170 may be input to an external outputting apparatus through the external apparatus interface 135.

A voice signal processed by the controller 170 may be audio output to the audio output unit 185. In addition, the voice signal processed by the controller 170 may be input to the external outputting apparatus through the external apparatus interface unit 135.

Although not shown in FIG. 2, the controller 170 may include a demultiplexer and an image processor, which will be described later with reference to FIG. 4.

The controller 170 may control entire operations in the image display device 100. For example, the controller 170 controls the tuner 110 to tune RF broadcasting corresponding to a channel selected by the user or a previously stored channel.

In addition, the controller 170 may control the image display device 100 by a user command input through the user input interface unit 150 or an internal program. In particular, the controller 170 may access the network to download applications or an application list desired by the user to the image display device 100.

For example, the controller 170 controls the tuner 110 so that the signal of a channel selected in accordance with a predetermined channel selecting command received through the user input interface unit 150 is input. The controller 170 processes the image, the voice, or the data signal of the selected channel. The controller 170 outputs information on the channel selected by the user through the display unit 180 or the audio output unit 185 together with the processed image or voice signal.

In another example, the controller 170 outputs an image signal or a voice signal from an external apparatus, for example, a camera or a camcorder, which is input through the external apparatus interface unit 135, through the display unit 180 or the audio output unit 185 in accordance with an external apparatus image replaying command received through the user input interface unit 150.

On the other hand, the controller 170 may control the display unit 180 to display an image. For example, the controller 170 may control the display unit 180 to display a broadcasting image input through the tuner 110, an external input image input through the external apparatus interface unit 135, an image input through the network interface unit, or an image stored in the storage unit 140. At this time, the image displayed on the display unit 180 may be a still image or a moving picture and may be a 2D image or a 3D image.

In addition, the controller 170 may perform control so that content is replayed. The content may be content stored in the image display device 100, received broadcasting content, or external input content input from the outside. The content may be at least one of a broadcasting image, an external input image, an audio file, a still image, an accessed web screen, and a document file.

When the storage content of the replayed content exists, the controller 170 may control the storage unit 140 to store at least one portion of the replayed content. For example, when the storage command on the replayed moving picture exists, the controller 170 may control the storage unit 140 to store a portion of the content from the corresponding command to the shutdown commend. On the other hand, the content before a predetermined period from the corresponding command may also be stored.

The controller 170 controls the display unit 180 to display a content object indicating the stored content and to display an object indicating the other users or the other electronic devices of the accessed network or the other networks linked to the accessed network.

At this time, when the content object displayed on the display unit 180 is dragged to be dropped to an object selected from objects indicating the other users or the other electronic devices by a control signal from a local key or a remote controlling apparatus, the controller 170 may perform control so that content stored in the selected user or the selected electronic device corresponding to the selected object may be transmitted.

On the other hand, the controller 170 may perform control so that the data amount of corresponding content changes and that the content data whose amount is changed is transmitted to the selected user or the selected electronic device in accordance with the network access state of the selected user or the selected electronic device.

On the other hand, the controller 170 may perform control so that a thumbnail image indicating the stored content is generated, that the thumbnail image is transmitted to the selected user or the selected electronic device during the transmission of the content data to the selected user or the selected electronic device, and that the stored content is transmitted to the selected user or the selected electronic device in accordance with a transmission request after the transmission request of the corresponding content is received from the selected user or the selected electronic device.

On the other hand, the controller 170 may perform control so that a stored content list is displayed on the display unit 180 and that content selected from the content list is transmitted to the selected user or the selected electronic device.

On the other hand, the controller 170 may control the storage unit 140 to store at least one portion of the replayed content when an object indicating the storage of content is selected from application objects indicating the applications stored in the image display device.

On the other hand, the controller 170 may control the storage unit 140 to stop storing the content when the shutdown command on content storage exists.

On the other hand, the controller 170 may control the display unit 180 to display an object indicating that the content is being stored or indicating the amount of the stored content.

On the other hand, the controller 170 may perform control so that applications or an application list that may be downloaded from the image display device 100 or an external network are displayed when access to an application watch article is performed.

The controller 170 may perform control so that applications downloaded from the external network are provided and driven together with various user interfaces. In addition, the controller 170 may perform control so that an image related to an application executed by the selection of the user is displayed on the display unit 180.

On the other hand, although not shown, a channel browsing processing unit for generating a thumbnail image corresponding to a channel signal or an external input signal may be further provided. The channel browsing processing unit may receive the TS output from the demodulating unit 120 or the TS output from the external apparatus interface nit 135 and may extract an image from the input TS to generate a thumbnail image. The generated thumbnail image is encoded to be input to the controller 170. In addition, the generated thumbnail image may be encoded in the form of a stream to be input to the controller 170. The controller 170 may display a thumbnail list including a plurality of thumbnail images on the display unit 180 using the input thumbnail image. On the other hand, the thumbnail images in the thumbnail list may be sequentially or simultaneously updated. Therefore, the user may conveniently grasp the contents of a plurality of broadcasting channels.

The display unit 180 converts an image signal a data signal and an on screen display (OSD) signal processed by the controller 170 or an image signal and a data signal received by the external apparatus interface unit 135 into R, G, and B signals to generate driving signals.

The display unit 180 may be a plasma display panel (PDP), a liquid crystal display (LCD), an organic light emitting display (OLED), a flexible display, and a 3D display.

On the other hand, the display unit 180 may include a touch screen to be used as an inputting apparatus other than an outputting apparatus.

The audio output unit 185 receives a voice processed signal, for example, a stereo signal, a 3.1 channel signal, or a 5.1 channel signal from the controller 170 to output the voice processed signal as voice. The audio output unit 185 may be realized by various types of speakers.

On the other hand, a photographing unit (not shown) for photographing the user may be further provided. The photographing unit (not shown) may be realized by a camera, however, is not limited to the above but may be realized by a plurality of cameras. Image information photographed by the photographing unit (not shown) is input to the controller 170.

On the other hand, in order to sense the gesture of the user, as described above, the sensing unit (not shown) including at least one of the touch sensor, the voice sensor, the position sensor, and the operation sensor may be further included in the image display device 100. A signal sensed by the sensing unit (not shown) may be transmitted to the controller 170 through the user input interface unit 150.

The controller 170 may sense the gesture of the user by the image photographed by the photographing unit (not shown) or the signal sensed by the sensing unit (not shown) or by the combination of the photographed image and the sensed signal.

The power supply unit 190 supplies corresponding power to the image display device 100. In particular, power may be supplied to the controller 170 that may be realized in the form of a system on chip (SOC), the display unit 180 for displaying an image, and the audio output unit 185 for outputting an audio signal.

For this purpose, the power supply unit 190 may include a converter (not shown) for converting AC power into DC power. On the other hand, for example, when the display unit 180 is realized by a LC panel including a plurality of backlight lamps, in order to change brightness or to drive dimming, an inverter (not shown) capable of performing a pulse width modulation (PWM) operation may be further provided.

The remote controlling apparatus 200 transmits a user input to the user input interface unit 150. For this purpose, the remote controlling apparatus 200 may use Bluetooth, RF communication, IR communication, an ultra wideband (UWB), and a ZigBee method.

In addition, the remote controlling apparatus 200 receives an image signal, a voice signal, or a data signal output from the user input interface unit 150 to display the received image, voice, or data signal on the remote controlling apparatus 200 or to output voice or vibration.

The above-described image display device 100 may be a digital broadcasting receiver capable of receiving at least one of digital broadcasting of an ATSC method (an 8-vestigial side bands (VSB) method) as a fixed type, digital broadcasting of a DVB-T method (a coded orthogonal frequency division multiplexing (COFDM) method), and digital broadcasting of an integrated services digital broadcasting (ISDB)-T method (a band segmented transmission (BST)-orthogonal frequency division multiplexing (OFDM) method).

On the other hand, the image display device described in the specification as an image display device from which the display unit 180 and the audio output unit 185 illustrated in FIG. 2 are excluded may be a wireless type image display device for transmitting data to or receiving data from the display unit 180 and the audio output unit 185 through wireless communication.

On the other hand, the block diagram of the image display device 100 illustrated in FIG. 2 is a block diagram illustrating an embodiment of the present invention. The components of the block diagram may be integrated, added, or omitted in accordance with the specification of the actually realized image display device 100. That is, as occasion demands, at least two components may be integrated into one component or one component may be divided into at least components. In addition, functions performed by blocks are for describing the embodiment of the present invention and detailed operations or apparatus do not limit the scope of the present invention.

On the other hand, unlike in FIG. 2, the image display device 100 may not include the tuner 110 and the demodulating unit 120 illustrated in FIG. 2 but may receive image content through the network interface unit 130 or the external apparatus interface unit 135 to replay the received image content.

Figure 3:
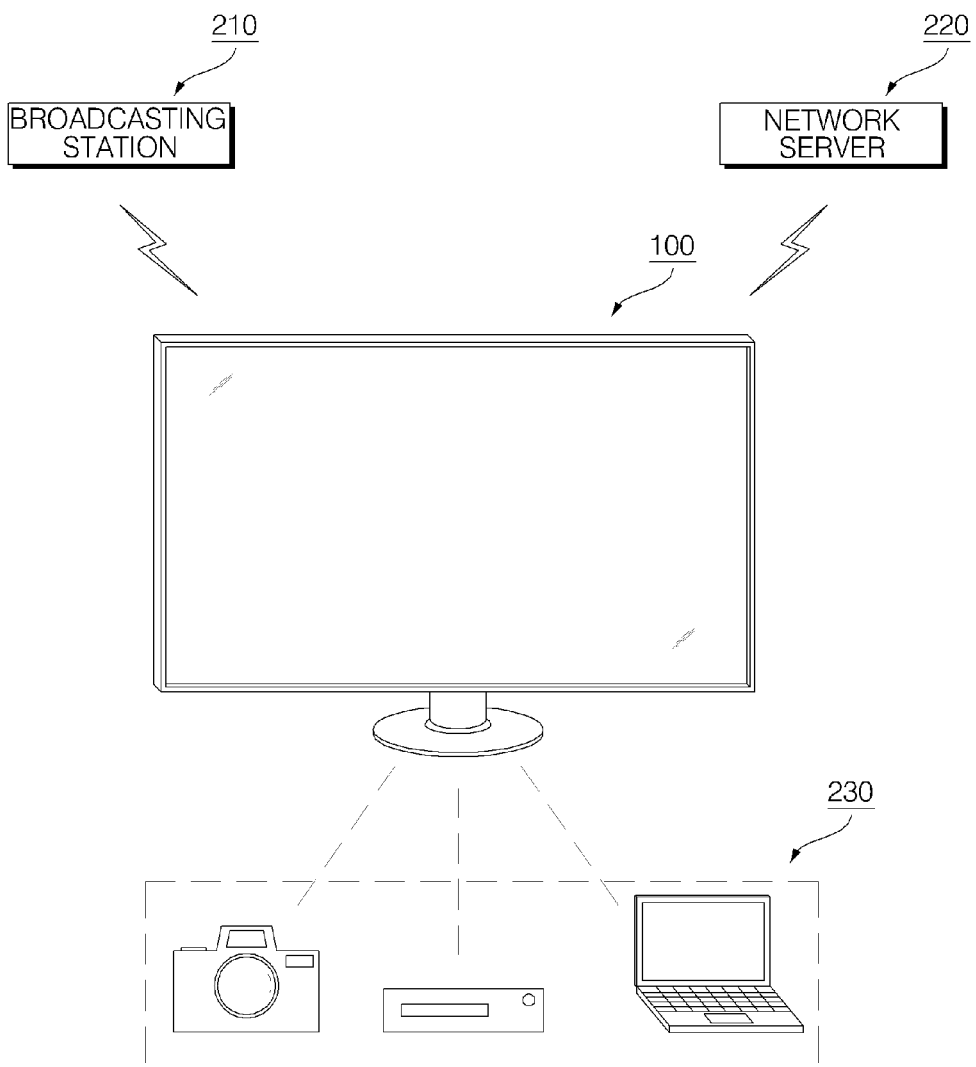
FIG. 3 is a view illustrating an apparatus capable of transmitting data to and receiving data from the image display device of FIG. 2.

FIG. 3 is a view illustrating an apparatus capable of transmitting data to and receiving data from the image display device of FIG. 2.

Referring to FIG. 3, the image display device 100 according to an embodiment of the present invention may communicate with a broadcasting station 210, a network server 220, or an external apparatus 230.

The image display device 100 may receive a broadcasting signal including an image signal transmitted by the broadcasting station 210. The image display device 100 may process an image signal and a voice signal or a data signal included in the broadcasting signal to be suitable for being output from the image display device 100. The image display device 100 may output an image or audio based on the processed image signal.

On the other hand, the image display device 100 may communicate with the network server 220. The network server 220 may transmit a signal to or receive a signal from the image display device 100 through an arbitrary network. For example, the network server 220 may be a mobile telephone terminal that may be connected to the image display device 100 through a wired or wireless base station. In addition, the network server 220 may provide content to the image display device 100 through the Internet network. A content provider may provide content to the image display device 100 using a network server.

On the other hand, the image display device 100 may communicate with the external apparatus 230. The external apparatus 230 may wiredly or wirelessly transmit a signal to or receive signal from the image display device 100. For example, the external apparatus 230 may be a media storage apparatus or a replaying apparatus used by the user. That is, the external apparatus 230 may be a camera, a DVD or a blu-ray player, and a personal computer.

The broadcasting station 210, the network server 220, or the external apparatus 230 may transmit a signal including an image signal to the image display device 100. The image display device 100 may display an image based on the image signal included in the input signal. In addition, the image display device 100 may transmit a signal transmitted from the broadcasting station 210 or the network server 220 to the image display device 100 to the external apparatus 230. In addition, a signal transmitted from the external apparatus 230 to the image display device 100 may be transmitted to the broadcasting station 210 or the network server 220. That is, the image display device 100 may transmit content included in the signal transmitted from the broadcasting station 210, the network server 220, and the external apparatus 230 as well as replay the content.

Figure 4:
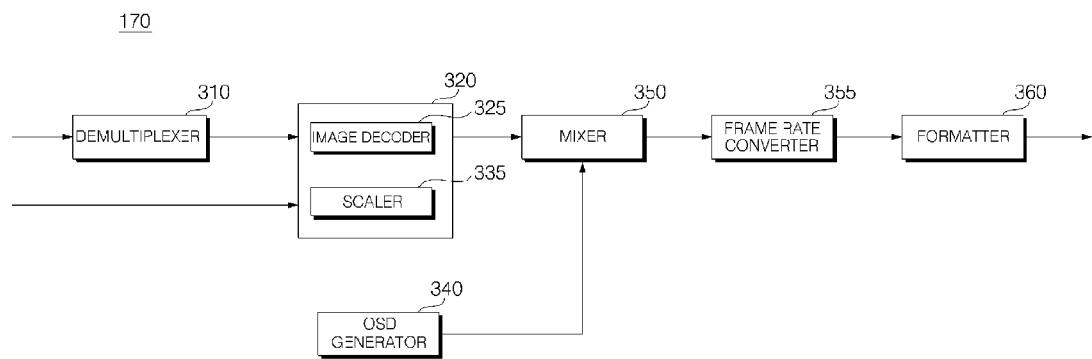
FIG. 4 is a block diagram illustrating the inside of the controller of FIG. 2.

FIG. 4 is a block diagram illustrating the inside of the controller of FIG. 2.

Referring to FIG. 4, the controller 170 according to an embodiment of the present invention may include a demultiplexer 310, an image processor 320, an OSD generator 340, a mixer 350, a frame rate converter (FRC) 355, and a formatter 360. A voice processing unit (not shown) and a data processing unit (not shown) may be further provided.

The demultiplexer 310 demultiplexes an input stream. For example, when an MPEG-2 TS is input, the MPEG-2 TS is demultiplexed to be divided into image, voice, and data signals. Here, the TS input to the demultiplexer 310 may be a TS output from the tuner 110, the demodulating unit 120, or the external apparatus interface unit 135.

The image processor 320 may process the demultiplexed image signal. For this purpose, the image processor 320 may include an image decoder 325 and a scaler 335.

The image decoder 325 decodes the demultiplexed image signal. The scaler 335 performs scaling so that the resolution of the decoded image signal may be output from the display unit 180.

The image decoder 325 may include decoders of various standards.

For example, when the demultiplexed image signal is an encoded image signal of MPEG-2 protocol, the image signal may be decoded by an MPEG-2 decoder.

In addition, for example, when the demultiplexed image signal is an encoded image signal of a digital multimedia broadcasting (DMB) method or an H.264 protocol in accordance with DVB-H, the image signal may be decoded by an H.264 decoder.

On the other hand, the image signal decoded by the image processor 320 is input to the mixer 350.

The OSD generator 340 generates an OSD signal in accordance with a user input or in itself. For example, a signal for displaying various information items on the screen of the display unit 180 by graphic or text may be generated based on a user input signal or a control signal. The generated OSD signal may include various data items such as the user interface screen of the image display device 100, various menu screens, widgets, and icons.

For example, the OSD generator 340 may generate a signal for displaying broadcasting information based on subtitles or electronic program guides (EPG) of a broadcasting image.

The mixer 350 may mix the OSD signal generated by the OSD generator 340 with the decoded image signal processed by the image processor 320. The mixed signal is provided to the formatter 360. The decoded broadcasting image signal or the external input signal is mixed with the OSD signal so that an OSD may be overlaid on a broadcasting image or an external input image.

The FRC 355 may convert the frame rate of an input image. For example, the FRC 355 converts the frame rate of 60 Hz into 120 Hz or 240 Hz. When the frame rate of 60 Hz is converted into 120 Hz, the same first frame may be inserted between a first frame and a second frame or an estimated third frame may be inserted from the first frame and the second frame. When the frame rate of 60 Hz is converted into 240 Hz, the same three frames may be further inserted or three estimate frames may be inserted. On the other hand, an input frame rate may be maintained without being converted.

The formatter 360 receives an output signal of the RFC 355 and changes the format of the received output signal to be suitable for the display unit 180 to output the signal whose format is changed. For example, R, G, and B data signals may be output and the R, G, and B data signals may be output by low voltage differential signaling (LVDS) or mini-LVDS.

On the other hand, the voice processing unit (not shown) in the controller 170 may process the demultiplexed voice signal. For this purpose, the voice processing unit (not shown) may include various decoders.

The voice processing unit (not shown) in the controller 170 may decode the demultiplexed voice signal when the demultiplexed voice signal is an encoded voice signal. For example, the demultiplexed voice signal may be decoded by an MPEG-2 decoder, an MPEG-4 decoder, an AAC decoder, or an AC-3 decoder.

In addition, the voice processing unit (not shown) in the controller 170 may process base, treble, and volume control.

The data processing unit (not shown) in the controller 170 may process the demultiplexed data signal. For example, when the demultiplexed data signal is an encoded data signal, the demultiplexed data signal may be decoded. The encoded data signal may be EPG information including broadcasting information such as the start time and the finish time of programs broadcasted by channels. For example, the EPG information of the ATSC method may be ATSC-program and system information protocol (PSIP) information and the EPG information of the DVB method may include DVB-service information (SI). The ATSC-PSIP information or the DVB-SI information may be included in the header (4 bytes) of the above-described stream, that is, the MPEG-2 TS.

On the other hand, the block diagram of the controller 170 illustrated in FIG. 4 is a block diagram according to an embodiment of the present invention. The components of the block diagram may be integrated, added, or omitted in accordance with the specification of the actually realized controller 170.

Figure 5:
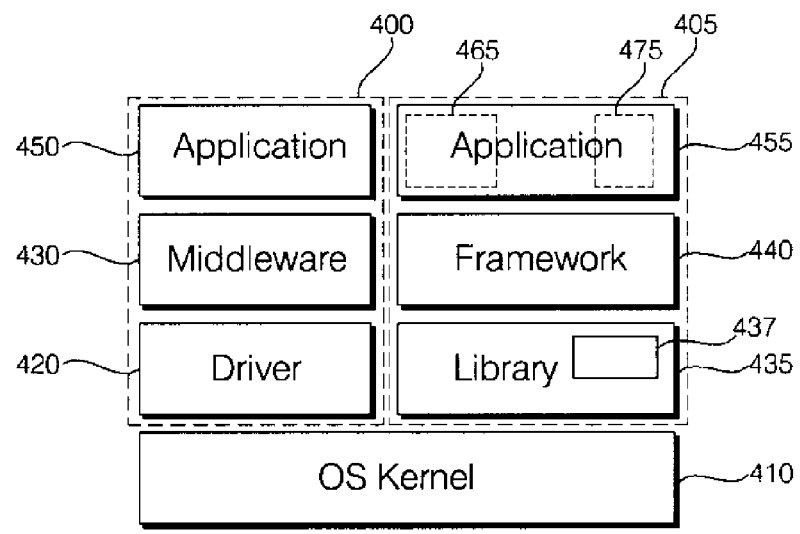
FIGS. 5 and 6 are views illustrating various examples of a platform block diagram of the image display device of FIG. 2.
Figure 6:
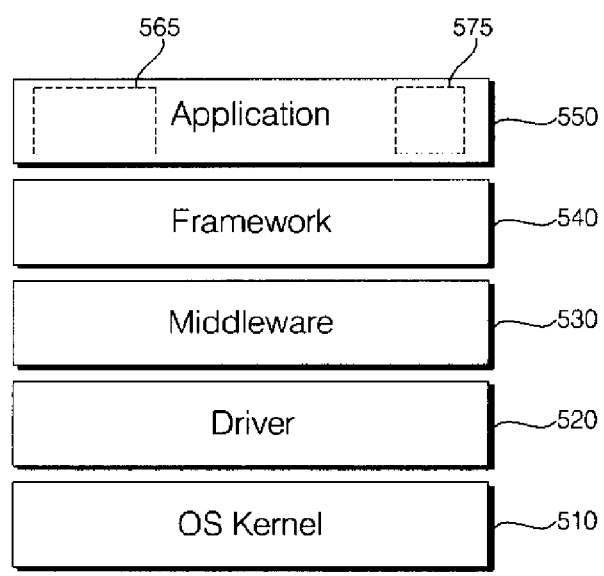

FIGS. 5 and 6 are views illustrating various examples of a platform block diagram of the image display device of FIG. 2.

The platform of the image display device 100 according to an embodiment of the present invention may include OS based software in order to the above-described various operations.

First, referring to FIG. 5, the platform of the image display device 100 according to another embodiment of the present invention as a separation type platform may be designed so that a legacy system platform 400 is separated from a smart system platform 405. An OS kernel 410 may be commonly used by the legacy system platform 400 and the smart system platform 405.

The legacy system platform 400 may include a driver 420 on the OS kernel 410, a middleware 430, and an application 450.

On the other hand, the smart system platform 405 may include a library 435 on the OS kernel 410, a framework 440, and an application 455.

The OS kernel 410 as the kernel of an operating system may perform at least one function of driving a hardware driver during driving the image display device 100, of securing hardware and a processor in the image display device 100, of efficiently managing system resource, of managing a memory, of providing an interface for hardware by making hardware abstract, of performing a multi-process, and of managing a schedule in accordance with the multi-process. On the other hand, the OS kernel 410 may further provide a power management.

The hardware driver in the OS kernel 410 may include at least one of, for example, a display driver, a Wi-Fi driver, a Bluetooth driver, an USB driver, an audio driver, a power management, a binder driver, and a memory driver.

In addition, the hardware driver in the OS kernel 410 for a hardware apparatus in the OS kernel 410 may include a character device driver, a block device driver, and a network device driver. The block device driver may need a buffer for keeping data of a unit magnitude since data is transmitted in units of a specific block. The character device driver may not need a buffer since data is transmitted in units of basic data, that is, in units of a character.

The OS kernel 410 may be realized by kernels based on various OSs such as a Unix based OS (LINUX) and a Window based OS. In addition, the OS kernel 410 as an opened OS kernel may be a general purpose OS kernel that may be used by the other electronic devices.

The driver 420 is positioned between the OS kernel 410 and the middleware 430 and drives a device for the operation of the application 450 together with the middleware 430. For example, the driver 420 may include drivers such as a microprocessor in the image display device 100, a display module, a graphic processing unit (GPU), a frame rate converter (FRC), a general purpose input/output pin (GPIO), a high definition multimedia interface (HDMI), an SDEC (a system decoder or a demultiplexer), a VDEC (a video decoder), an ADEC (an audio decoder), a personal video recorder (PVR), and a I2C (an inter-integrated circuit). The drivers operate to be interlocked with the hardware driver in the OS kernel 410.

In addition, the driver 420 may further include the driver of the remote controlling apparatus 200, in particular, a later-mentioned space remote controller. On the other hand, the driver of the space remote controller may be variously provided in the OS kernel 410 or the middleware 430 other than the driver 420.

The middleware 430 is positioned between the OS kernel 410 and the application 450 and may function as a medium so that data is transmitted to and received from another hardware or software. Therefore, it is possible to provide a standardized interface, to support various environments, and to perform interlocking between works having different systems.

The middleware 430 in the legacy system platform 400 may be, for example, the middleware of a multimedia and hypermedia information coding experts group (MHEG) or an advanced common application platform (ACAP) that is data broadcasting related middleware. The middleware 430 may include the middleware of the PSIP or the SI that is broadcasting information related middleware and DLNA middleware that is peripheral device communication related middleware.

The application 450 on the middleware 430, that is, the application 450 in the legacy system platform 400 may include, for example, a user interface application about various menus in the image display device 100. The application 450 on the middleware 430 may be edited by the selection of a user and may be updated through a network. It is possible to access a desired menu among various user interfaces using the application 450 in accordance with the input of the remote controlling apparatus 200 during watching a broadcasting image.

In addition, the application 450 in the legacy system platform 400 may include at least one of a TV guide application, a Bluetooth application, a reservation application, a digital video recorder (DVR) application, and a hotkey application.

On the other hand, the library 435 in the smart system platform 405 is positioned between the OS kernel 410 and the framework 440 and may form the base of the framework 440. For example, the library 435 may include a media framework that is a media related library such as a secure socket layer (SSL) that is a security related library, Webkit that is a web engine related library, libc (c library), a video format, and an audio format. The library 435 may be created based on C or C++. In addition, the library 435 may be exposed to a developer through the framework 440.

The library 435 may include a runtime 437 including a core java library and a virtual machine (VM). The runtime 437 forms the base of the framework 440 together with the library 435.

The VM may perform a plurality of instances, that is, multitasking. On the other hand, VMs are assigned in accordance with the applications in the application 455 to be executed. At this time, in order to correct or interconnect schedules among a plurality of instances, a binder driver (not shown) in the OS kernel 410 may operate.

On the other hand, the binder driver and the runtime 437 may connect the java based application to the C based library.

On the other hand, the library 435 and the runtime 437 may correspond to the middleware of the legacy system.

On the other hand, the framework in the smart system platform 405 includes programs that are the bases of the applications in the application 455. The framework 440 is compatible to any application. Components may be re-used, moved, or exchanged. The framework 440 may include a support program and a program for compiling other software components. For example, the framework 440 may include a resource manager, an activity manager related to the activities of the applications, a notification manager, and a content provider for summarizing share information among the applications. The framework 440 may be created based on java.

The application 455 on the framework 440 includes various programs that are driven in the image display device 100 to be displayed. For example, the application 455 may include a core application including at least one of an e-mail, a short message service (SMS), a calendar, a map, and a browser. The application 450 may be created based on java.

In addition, the application 455 may be divided into an application 465 that is stored in the image display device 100 and that may not be deleted by the user and an application 475 that is downloaded through an external apparatus or a network to be stored and that may be freely provided or deleted by the user.

An Internet telephone service, a video on demand (VOD), a web album service, a social networking service (SNS), a location based service (LBS), a map service, a web search service, and an application search service may be performed by accessing the network through the applications in the application 455. In addition, various functions such as gaming and schedule management may be performed.

Next, referring to FIG. 6, the platform of the image display device 100 according to an embodiment of the present invention as an integration type platform may include an OS kernel 510, a driver 520, a middleware 530, a framework 540, and an application 550.

The platform of FIG. 6 is different from the platform of FIG. 5 in that the library 435 of FIG. 5 is omitted and the application 550 is provided as an integrated layer. The driver 520 and the framework 540 correspond to the driver 420 and the framework 440 of FIG. 5.

On the other hand, the library 435 of FIG. 5 is integrated with the middleware 530. That is, the middleware 530 may include the SSL that is the security related library, the Webkit that is the web engine related library, the libc, and the media framework that is the media related library as middleware in the image display device system as well as the middleware of the MHEG or the ACAP that is the data broadcasting related middleware, the middleware of the PSIP or the SI that is the broadcasting information related middleware, and the DLNA middleware that is the peripheral device communication related middleware as middleware in the legacy system. On the other hand, the above-described runtime may be further provided.

The application 550 may include the menu related application, the TV guide application, and the reservation application as the applications in the legacy system and the e-mail, the SMS, the calendar, the map, and the browser as the applications in the image display device system.

On the other hand, the application 550 may be divided into an application 565 that is stored in the image display device 100 and that may not be deleted by a user and an application 575 that is downloaded through an external apparatus or a network to be stored and may be freely provided or deleted by the user.

The above-described platform of FIGS. 5 and 6 may be generally used by various electronic devices as well as the image display device. On the other hand, the platform of FIGS. 5 and 6 may be loaded in the above-described storage unit 140 or controller 170 or a separate processor (not shown).

Figure 7:
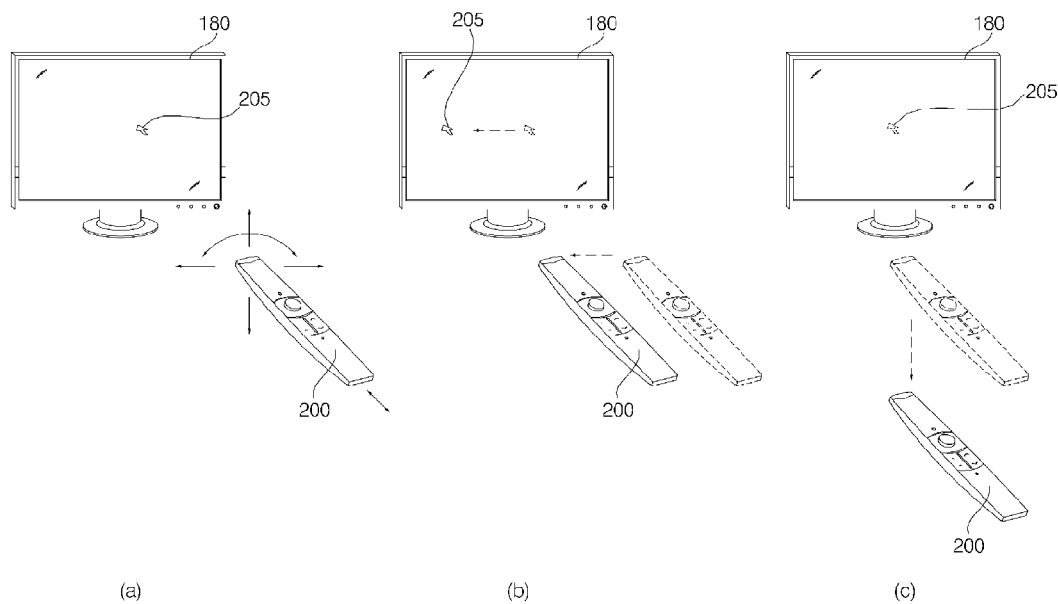
FIG. 7 is a view illustrating an operation of the remote controlling apparatus of FIG. 2.

FIG. 7 is a view illustrating an operation of the remote controlling apparatus of FIG. 2.

Referring to FIG. 7, the remote controlling apparatus 200 may transmit a signal to or receive a signal from the image display device 100 in accordance with the RF communication protocol or the IR communication protocol.

FIG. 7A illustrates that a pointer 205 corresponding to the remote controlling apparatus 200 is displayed on the remote controlling apparatus 200.

A user may move the remote controlling apparatus 200 up and down, from side to side (FIG. 7B), and back and forth (FIG. 7C) or may rotate the remote controlling apparatus 200. The pointer 205 displayed on the image display device 100 corresponds to the movement of the remote controlling apparatus 200. The remote controlling apparatus 200 may be referred to as a space remote controller since the corresponding pointer 205 is moved in accordance with the movement on a 3D space to be displayed as illustrated in FIG. 7.

FIG. 7B illustrates that, when the user moves the remote controlling apparatus 200 to the left, the pointer 205 displayed on the image display device 100 is moved to the left to correspond to the movement of the remote controlling apparatus 200. Information on the movement of the remote controlling apparatus 200 sensed by the sensor of the remote controlling apparatus 200 is transmitted to the image display device 100. The image display device 100 may calculate the coordinates of the pointer 205 from the information on the movement of the remote controlling apparatus 200. The image display device 100 may display the pointer 205 to correspond to the calculated coordinates.

FIG. 7C illustrates a case in which the user moves the remote controlling apparatus 200 to be remote from the display unit 180 in a state where a specific button in the remote controlling apparatus 200 is pressed. Therefore, a selection region in the display unit 180 corresponding to the pointer 205 may be zoomed in to be enlarged and displayed. To the contrary, when the user moves the remote controlling apparatus 200 to be close to the display unit 180, the selection region in the display unit 180 corresponding to the pointer 205 is zoomed out to be reduced and displayed. On the other hand, the selection region is zoomed out when the remote controlling apparatus 200 is remote from the display unit 180 and is zoomed in when the remote controlling apparatus 200 is close to the display unit 180.

On the other hand, recognition of the up and down movement and the from side to side movement may be excluded in the state where the specific button in the remote controlling apparatus 200 is pressed. That is, when the remote controlling apparatus 200 moves to be remote from or close to the display unit 180, the up and down movement and the from side to side movement are not recognized and only the back and forth movement is recognized. In a state where the specific button in the remote controlling apparatus 200 is not pressed, only the pointer 205 is moved in accordance with the up and down movement and the from side to side movement of the remote controlling apparatus 200.

On the other hand, movement speed or movement direction of the pointer 205 may correspond to movement speed or movement direction of the remote controlling apparatus 200.

On the other hand, the pointer in the specification means an object displayed on the display unit 180 to correspond to an operation of the remote controlling apparatus 200. Therefore, various-shaped objects other than the arrow-shaped object illustrated in the drawing may be used as the pointer 205. For example, the objects may include a point, a cursor, a prompt, and a thick outline. The pointer 205 may be displayed to correspond to a plurality of points such as a line and a surface as well as a point in the horizontal axis or the vertical axis on the display unit 180.

Figure 8:
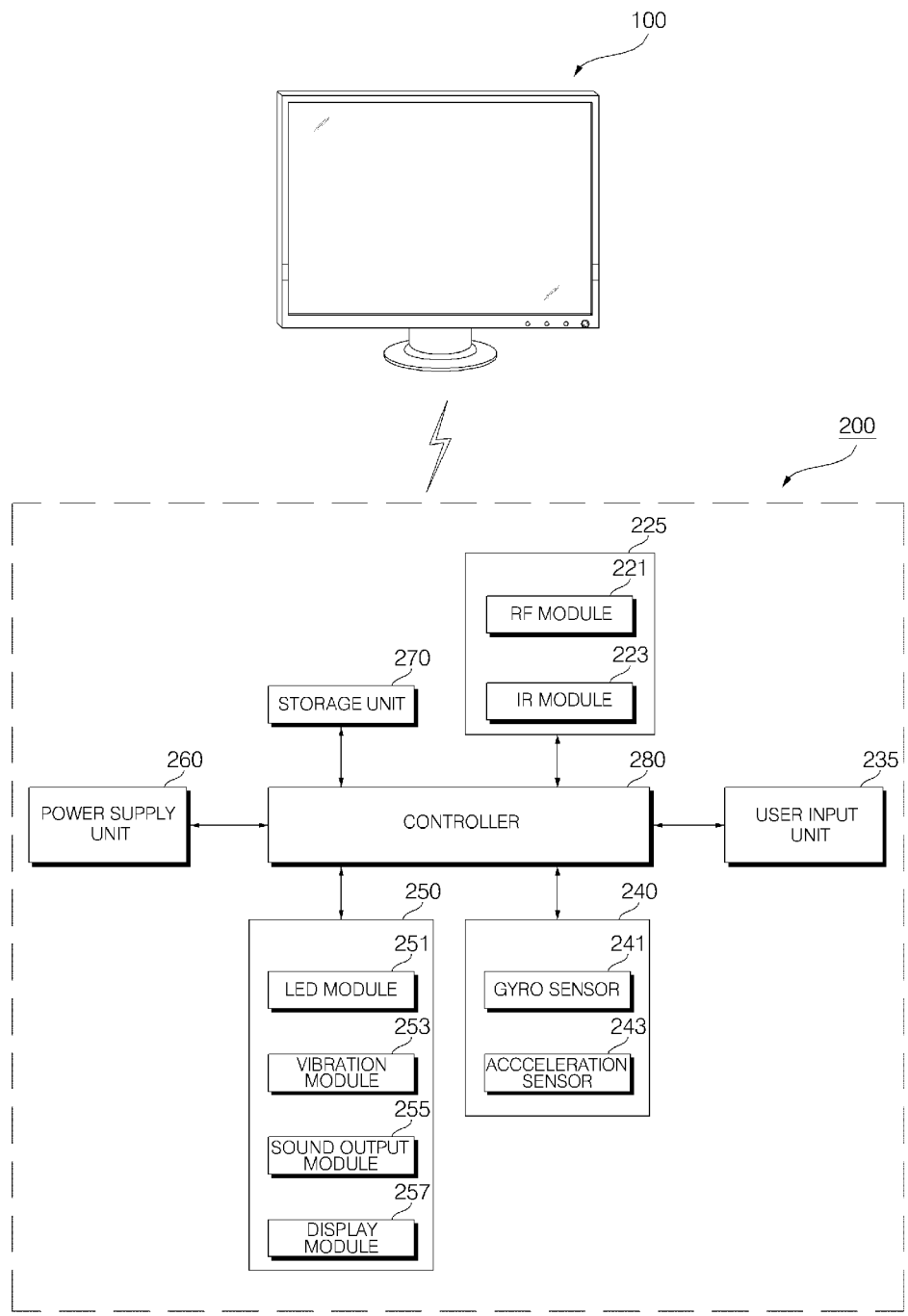
FIG. 8 is a block diagram illustrating the inside of the remote controlling apparatus of FIG. 2.

FIG. 8 is a block diagram illustrating the inside of the remote controlling apparatus of FIG. 2.

Referring to FIG. 8, the remote controlling apparatus 200 may include a wireless communication unit 225, a user input unit 235, a sensor unit 240, an output unit 250, a power supply unit 260, a storage unit 270, and a controller 280.

The wireless communication unit 225 transmits a signal to and receives a signal from the image display device 100. According to the embodiment, the remote controlling apparatus 200 may include an RF module 221 capable of transmitting a signal to and receiving a signal from the image display device 100 in accordance with the RF communication protocol.

According to the embodiment, the remote controlling apparatus 200 transmits a signal including information on the movement of the remote controlling apparatus 200 to the image display device 100 through the RF module 221. In addition, the remote controlling apparatus 200 may receive the signal transmitted by the image display device 100 through the RF module 221. In addition, the remote controlling apparatus 200 may transmit commands on power on/off, channel change, and volume change to the image display device 100 through the IR module 223 as occasion demands.

The user input unit 235 may include a keypad, a button, a touch pad, or a touch screen. The user manipulates the user input unit 235 to input a command related to the image display device 100 to the remote controlling apparatus 200. When the user input unit 235 includes a hard key button, the user may input the command related to the image display device 100 to the remote controlling apparatus 200 by pushing the hard key button. When the user input unit 235 includes the touch screen, the user may touch the soft key of the touch screen to input the command related to the image display device 100 to the remote controlling apparatus 200. In addition, the user input unit 235 may include various kinds of input means that may be manipulated by the user such as a scroll key and a jog key. According to the embodiment, the input means are not limited to the above.

The sensor unit 240 may include a gyro sensor 241 or an acceleration sensor 243. The gyro sensor 241 may sense information on the movement of the remote controlling apparatus 200. For example, the gyro sensor 241 may sense the information on the movement of the remote controlling apparatus 200 based on x, y, and z axes. The acceleration sensor 243 may sense information on the movement speed of the remote controlling apparatus 200. On the other hand, the acceleration sensor 243 may further include a distance measuring sensor to sense the distance between the sensor unit 240 and the display unit 180.

The output unit 250 may output an image or voice signal corresponding to the manipulation of the user input unit 235 or the signal transmitted by the image display device 100. The user may determine whether the user input unit 235 is manipulated or the image display device 100 is controlled.

For example, the output unit 250 may include a light emitting diode (LED) module 251 lighted when the user input unit 235 is manipulated or a signal is transmitted to or received from the image display device 100 through the wireless communication unit 225, a vibration module 253 for generating vibration, a sound output module 255 for outputting sound, and a display module 257 for outputting an image.

The power supply unit 260 supplies power to the remote controlling apparatus 200. The power supply unit 260 stops supplying power when the remote controlling apparatus 200 does not move for predetermined time to prevent power from being wasted. The power supply unit 260 may re-start power supply when a predetermined key included in the remote controlling apparatus 200 is manipulated.

The storage unit 270 may store various kinds of programs and application data required for controlling or operating the remote controlling apparatus 200. When the remote controlling apparatus 200 wirelessly transmits a signal to and receives a signal from the image display device 100 through the RF module 221, the remote controlling apparatus 200 transmits the signal to and receives the signal from the image display device 100 in a predetermined frequency band. The controller 280 of the remote controlling apparatus 200 may store information on the frequency band in which the remote controlling apparatus 200 may wirelessly transmit the signal to and receive the signal from the image display device 100 paired with the remote controlling apparatus 200 in the storage unit 270 to refer to the stored information.

The controller 280 controls entire articles related to control of the remote controlling apparatus 200. The controller 280 may transmit a signal corresponding to predetermined key manipulation of the user input unit 235 or a signal corresponding to the movement of the remote controlling apparatus 200 sensed by the sensor unit 240 to the image display device 100 through the wireless communication unit 225.

Figure 9:
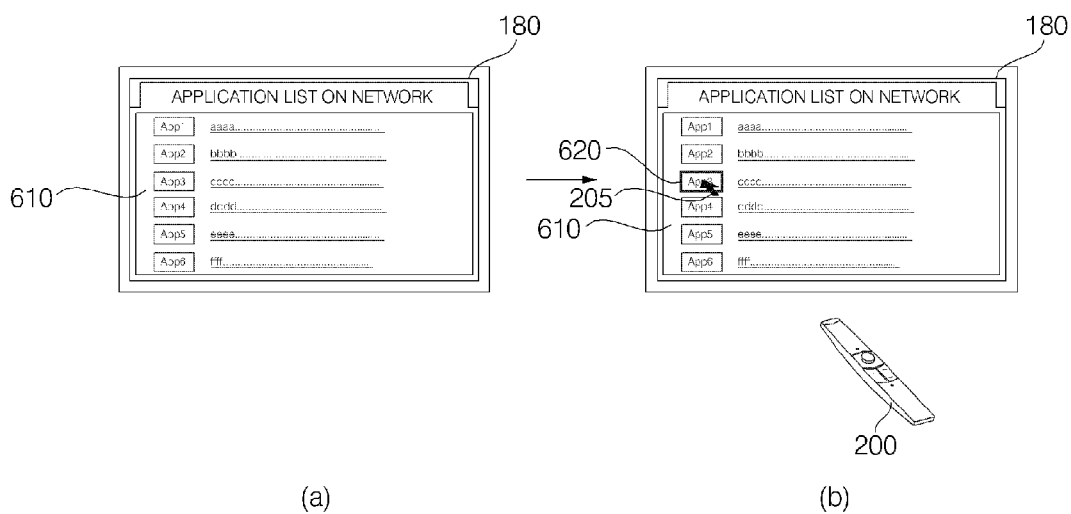
FIGS. 9 and 10 are views referred to in order to describe various examples of a method for operating the image display device according to the embodiment of the present invention.
Figure 10:
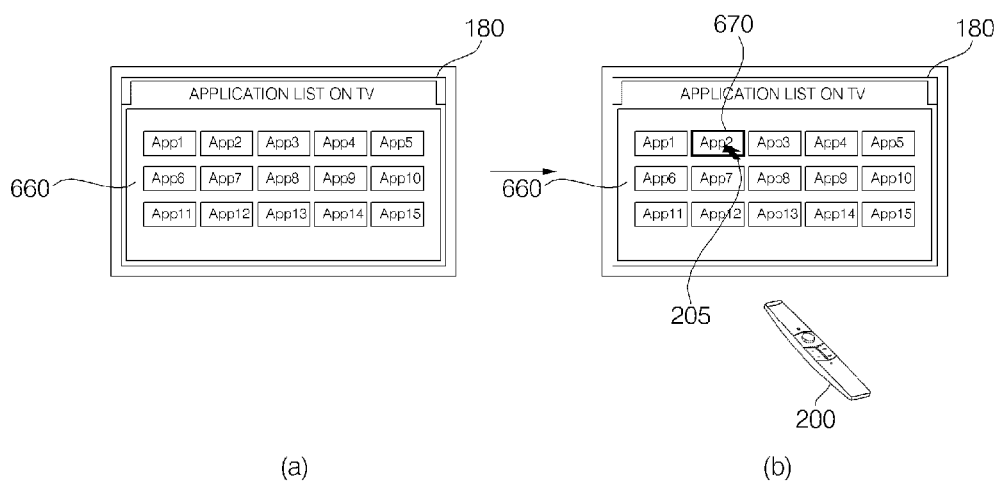

FIGS. 9 and 10 are views referred to in order to describe various examples of a method for operating the image display device according to the embodiment of the present invention.

First, FIG. 9 illustrates that an application list on a network is displayed on the display unit 180. That is, a user may directly access a corresponding content server or a network server and may search various applications to download the applications.

FIG. 9A illustrates that an application list 610 in the accessed server is displayed on the display unit 180. The application list 610 may include icons indicating applications and brief description information on the applications. On the other hand, since full browsing may be performed by the image display device 100, the icons or the description information received from the accessed server may be enlarged to be displayed. Therefore, the user may easily grasp the applications, which will be described later.

Next, FIG. 9B illustrates that one application 620 in the corresponding application list 610 is selected using the pointer 205 of the remote controlling apparatus 200. Therefore, the corresponding application may be conveniently downloaded.

On the other hand, FIG. 10 illustrates that an application list in the image display device is displayed on the display unit.

First, FIG. 10A illustrates that an application list 660 stored in the image display device 100 is displayed on the display unit 180 when access to an application list watch article is performed by the user manipulating the remote controlling apparatus 200. In the drawing, only the icons indicating the applications are illustrated. However, the present invention is not limited to the above. As illustrated in FIG. 9, the brief description information on the applications may be included. Therefore, the user may easily grasp the applications.

Next, FIG. 10B illustrates that one application 670 is selected from the corresponding application list 660 using the pointer 205 of the remote controlling apparatus 200. Therefore, the corresponding application may be conveniently executed.

Figure 11:
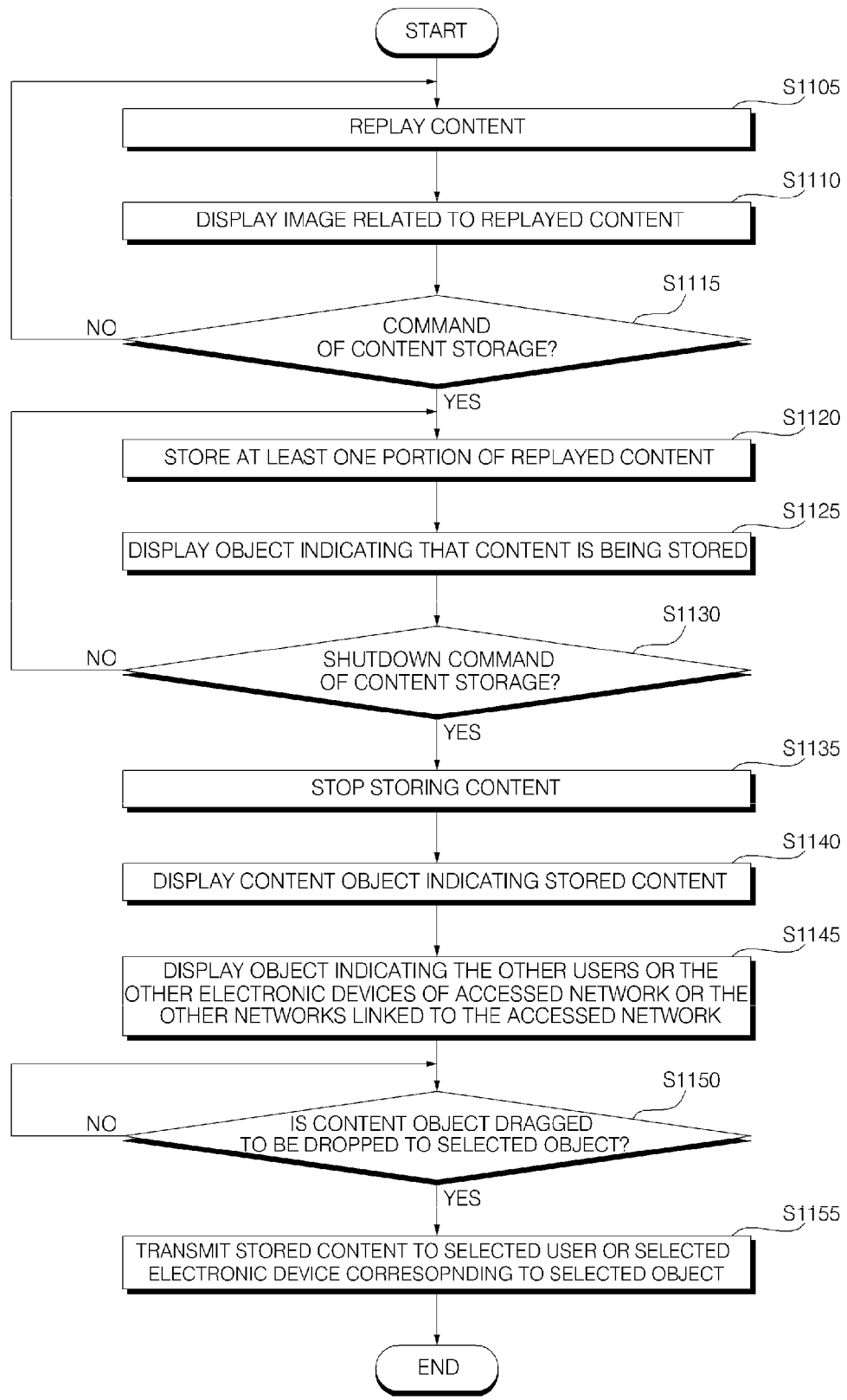
FIG. 11 is a flowchart illustrating the method for operating the image display device according to the embodiment of the present invention.
Figure 12:
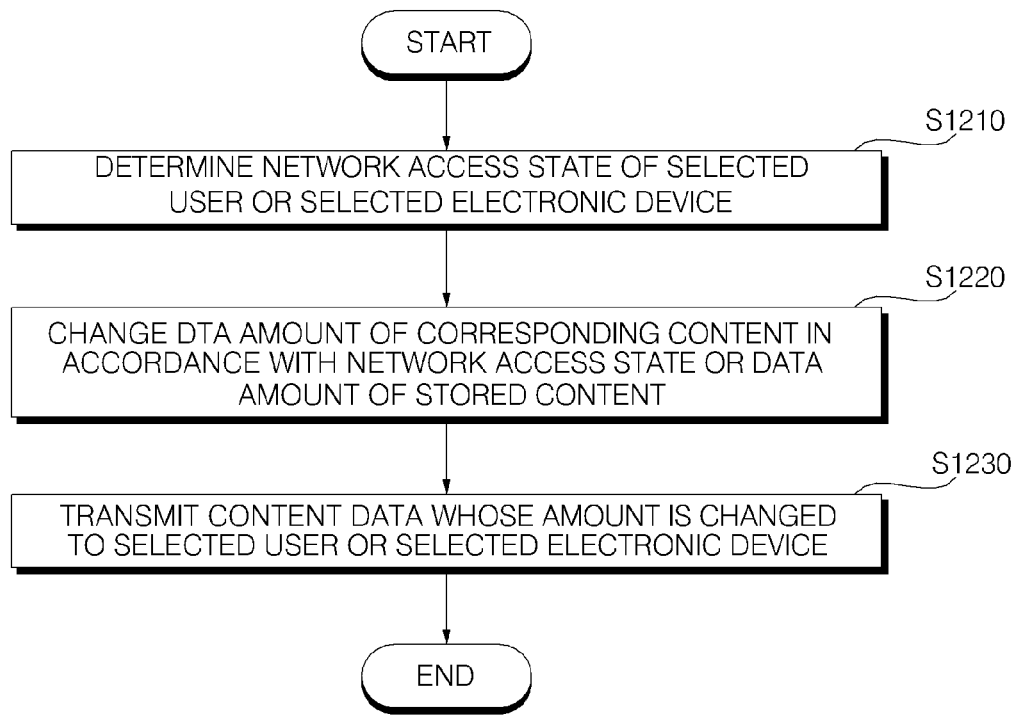
FIGS. 12 and 13 are flowcharts illustrating various examples of the transmitting processes of FIG. 11.
Figure 13:
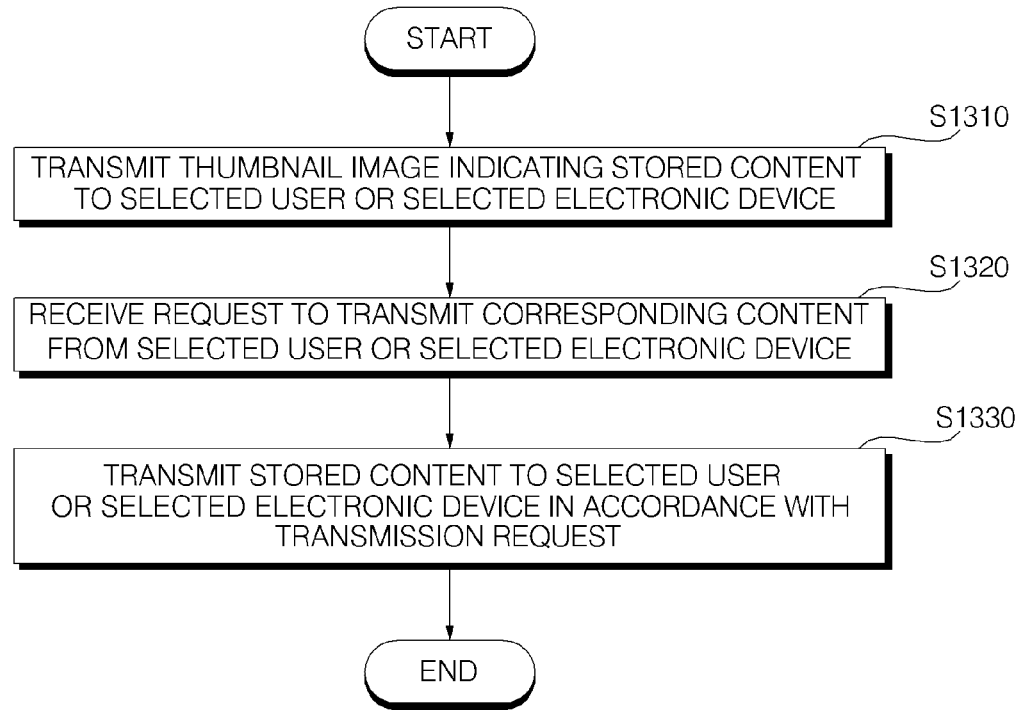

FIG. 11 is a flowchart illustrating the method for operating the image display device according to the embodiment of the present invention. FIGS. 12 and 13 are flowcharts illustrating various examples of the transmitting processes of FIG. 11. FIGS. 14 to 38 are views referred to in order to describe various examples of the method for operating the image display device of FIG. 11.

Referring to FIG. 11, first, content is replayed (S1105).

The controller 170 performs control so that the content is replayed. For example, content replay may be performed by a content replay input from the remote controlling apparatus 200 or a local key (not shown). The content may be content in the image display device 100 or in an external apparatus connected to the image display device or content received through an accessed network. The content may be at least one of a broadcasting image, an external input image, an audio file, a still image, an accessed web screen, and a document file.

When the content is replayed, an image related to the replayed content is displayed (S1110).

Figure 14:
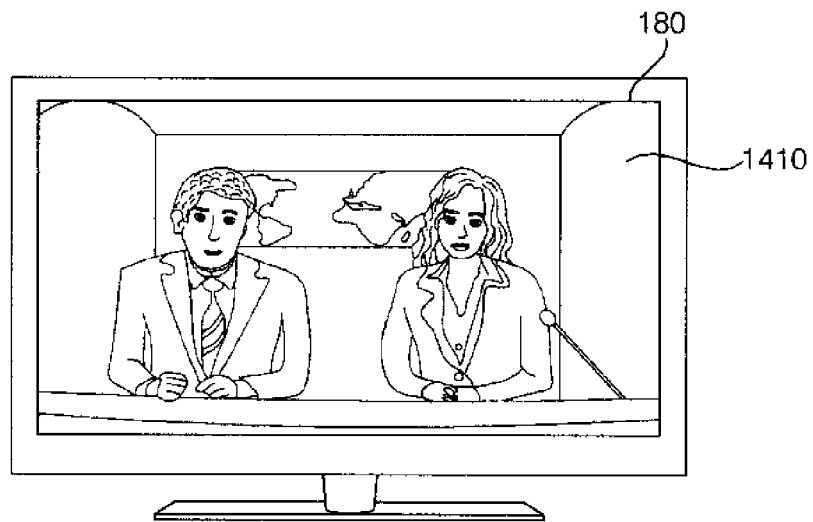
FIGS. 14 to 38 are views referred to in order to describe various examples of the method for operating the image display device of FIG. 11.
Figure 33:
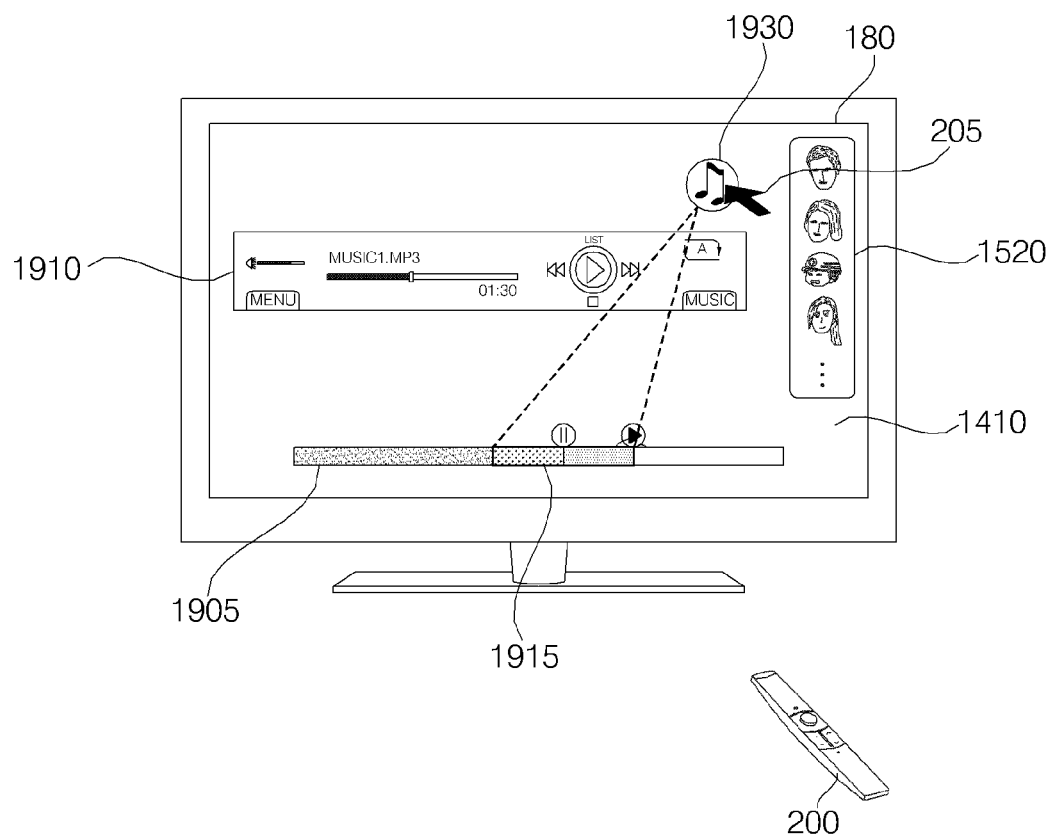
Figure 35:
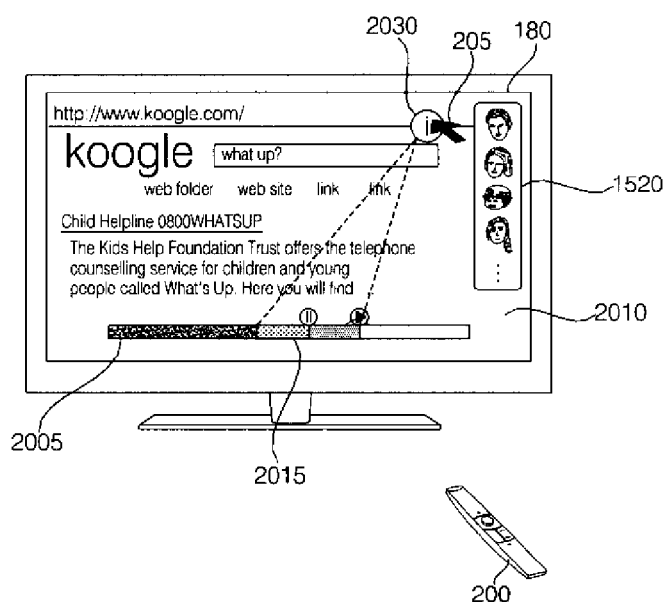
Figure 37:
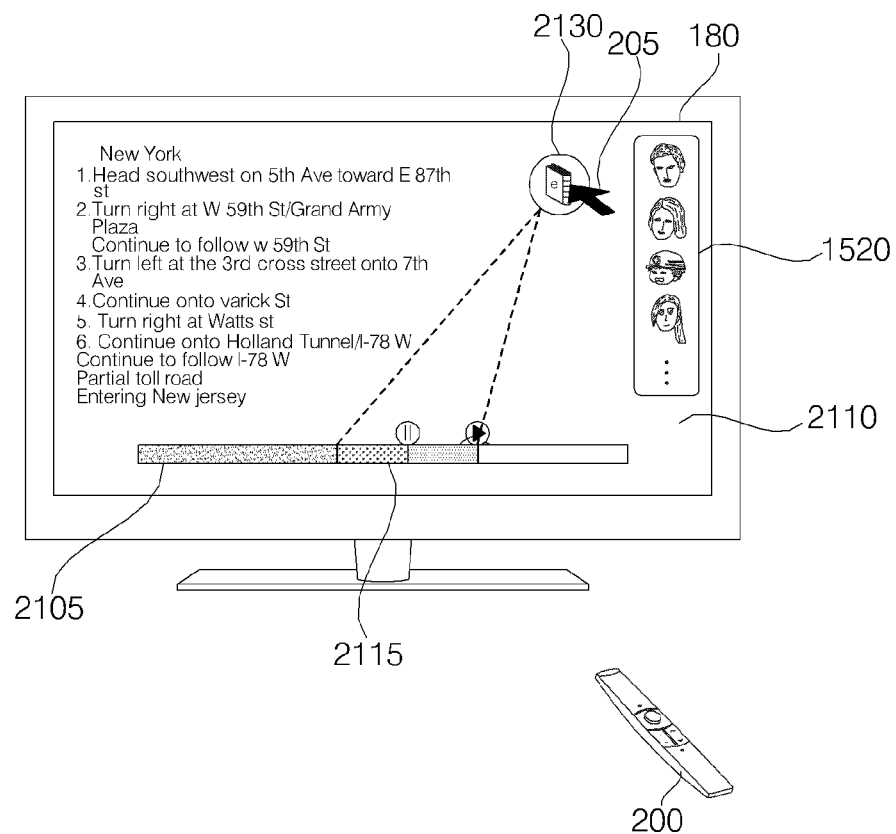

The controller 170 performs control so that the image related to the replayed content is displayed when the content is replayed. For example, as illustrated in FIG. 14, when broadcasting is replayed, a corresponding broadcasting image 1410 is displayed on the display unit 180. In addition, as illustrated in FIG. 33, when the audio file is replayed, an image 1910 indicating that the audio file is replayed is displayed on the display unit 180. In addition, as illustrated in FIG. 35, when access to a predetermined web server is performed through the network, a corresponding web screen 2010 is displayed on the display unit 180. In addition, as illustrated in FIG. 37, when an e-book file is replayed, an image 2110 indicating that the e-book file is replayed is displayed on the display unit 180.

Next, it is determined whether a storage command on the replayed content exists (S1115). When it is determined that the storage command exists, at least one portion of the replayed content is stored (S1120). At this time, an object indicating that the content is stored is displayed (S1125).

A content storage command may be input by inputting a specific key in the remote controlling apparatus 200 or by accessing a corresponding menu to select a content storage article. On the other hand, an application for storing the content may be executed.

Figure 15:
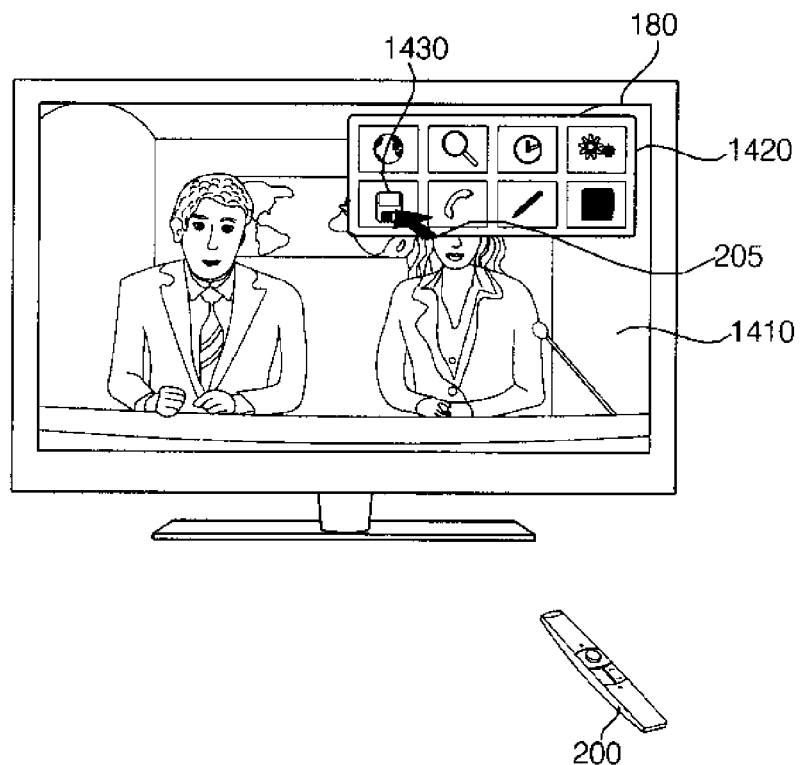

FIG. 15 illustrates that an application object 1420 is displayed on the display unit 180. A content storage application object 1430 may be selected by the user. In the drawing, the content storage application object 1430 is selected using the pointer 205 of the remote controlling apparatus 200. Therefore, the user may conveniently and rapidly store the content that is being replayed.

On the other hand, the application object 1420 may include an Internet access application object, a telephone access application object, an environment setting application object, a character input application object, and a clock related application object.

Figure 16:
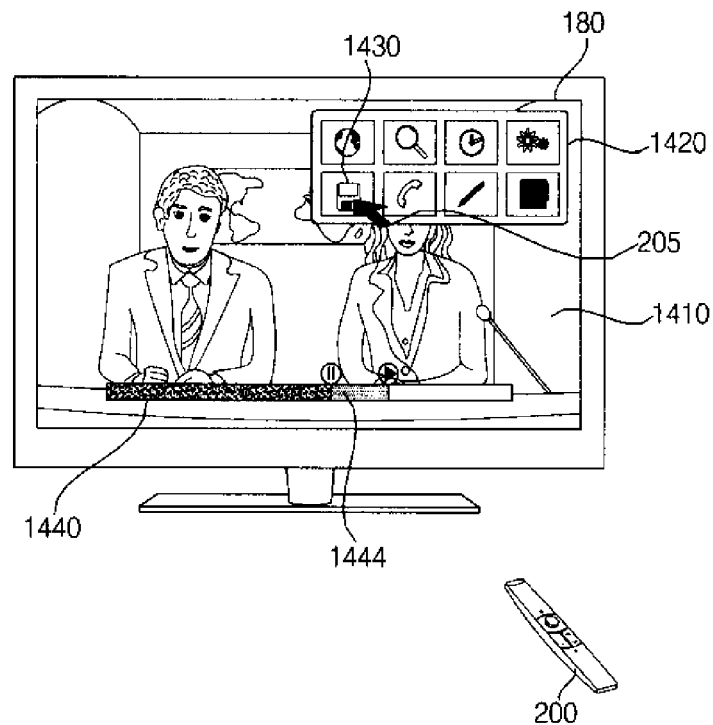

At least one portion of the replayed content is stored in accordance with the content storage command. FIG. 16 illustrates that a portion of the replayed broadcasting image 1410 is stored. At this time, an object 1440 indicating that a portion of the broadcasting image is stored may be displayed. In the drawing, a scroll bar is used as the object 1440. However, various examples are available. In addition, an object 1444 indicating the amount of the content stored from the point of the storage command to a current point may be displayed. Therefore, the user may conveniently recognize a content storage state.

On the other hand, it is determined whether a shutdown command on content storage exists (S1130). When it is determined that the shutdown command exists, the content storage is terminated (S1135). Then, an object indicating the stored content is displayed (S1140).

The content storage command may be input by inputting the specific key in the remote controlling apparatus 200 or by accessing the corresponding menu to select the content storage article. On the other hand, the application for storing the content may be executed.

Figure 17:
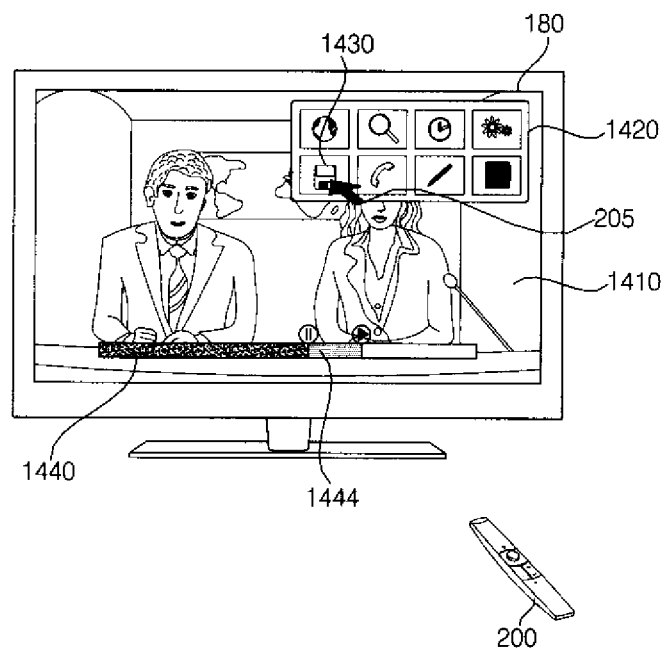

FIG. 17 illustrates that the content storage application object 1430 is selected from the application object 1420 once more. Therefore, the shutdown command on the content storage may be input. In addition, in the drawing, the content storage application object 1430 is selected once more using the pointer 205 of the remote controlling apparatus 200. Therefore, the user may conveniently and rapidly store the content that is being replayed.

On the other hand, the color, the brightness, and the frame of the content storage application object 1430 may vary in accordance with a number of times at which the content storage application object 1430 is selected by the pointer 205. For example, when the content storage application object 1430 is selected once so that the content storage is executed, at least one of the color, the brightness, and the frame of the corresponding object 1430 is changed. When the content storage application object 1430 is selected twice so that the content storage is stopped, the corresponding object 1430 may be restored to the original state. Therefore, the user may intuitively grasp whether the content is being stored through the content storage application object 1430.

On the other hand, in FIG. 17, when the content storage is completed, the object 1444 indicating the amount of the stored content is displayed from the start of the content storage command to the end of the content storage command. Therefore, the user may conveniently grasp the amount of the stored content.

Figure 18:
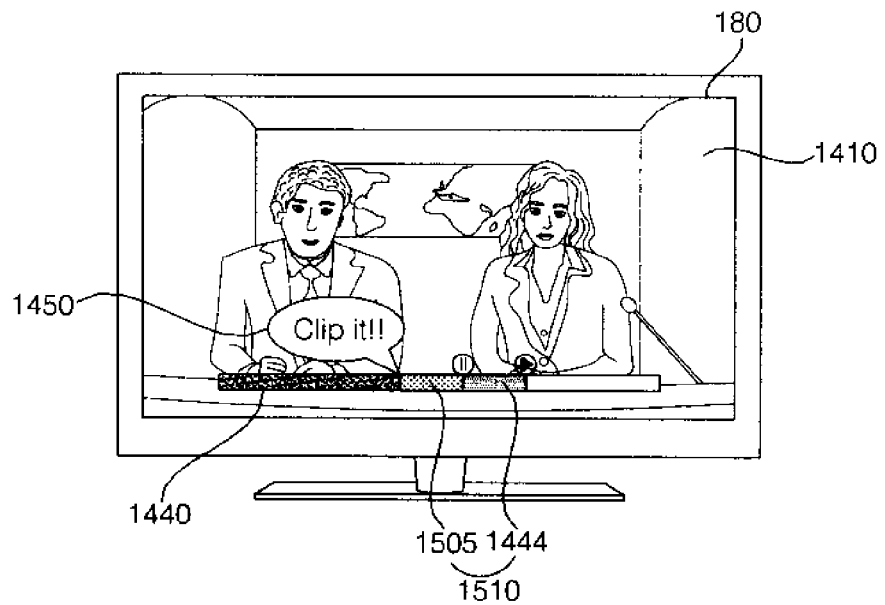

In FIG. 18, an object 1450 ("Clip it") indicating the end of the content storage is displayed. At this time, the object 1440 indicating that a portion of the broadcasting image is stored may be displayed. In particular, an object 1510 indicating the stored content may be displayed. The object 1510 indicating the stored content may further include an object 1505 indicating that content before a predetermined period is stored at the point of the content storage command as well as the object 1444 indicating the amount of the content stored from the start of the content storage command to the end of the content storage command. Such a function of automatically storing a predetermined section before the content storage command for the case in which the user missed the storage point of a desired section may be selectively performed.

On the other hand, an object indicating the other users or the other electronic devices of an accessed network or the other networks linked to the accessed network is displayed (S1145).

The controller 170 performs control so that the object indicating the other users or the other electronic devices of the accessed network or the other networks linked to the accessed network is displayed on the display unit 180 in order to transmit the stored content. In particular, an object indicating a user or an electronic device that are previously registered may be displayed.

Figure 19:
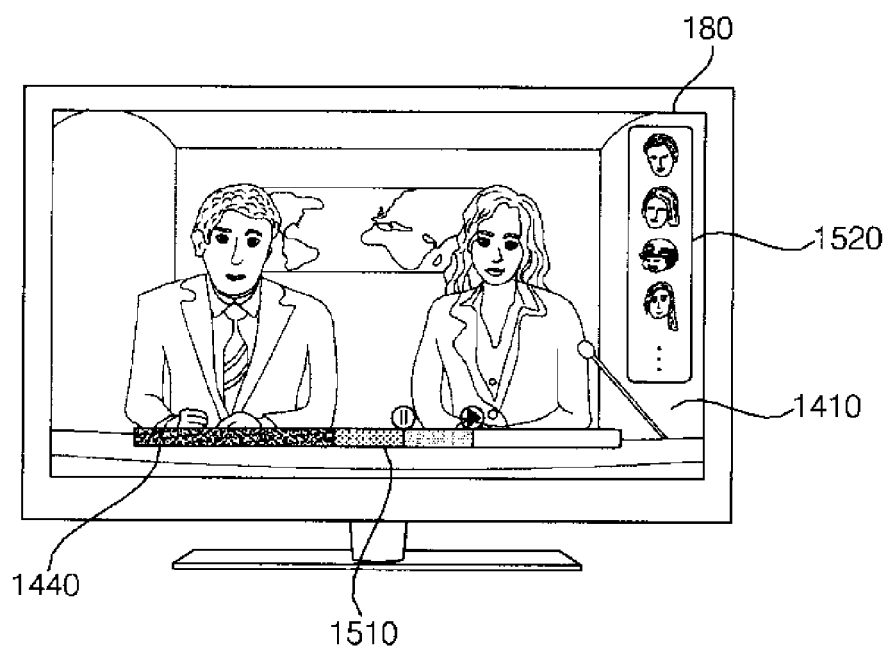

FIG. 19 illustrates that an object 1520 indicating the users who access the network is displayed. The object may include at least one of the icon, the nickname, and the name of each of the users. Therefore, the users may recognize the access states to the network of the users.

At this time, it is determined whether the content object is dragged and dropped to an object selected from objects indicating the other users or the other electronic devices (S1150). When it is determined that the content object is dragged and dropped to the selected object, the content stored in the selected user or the selected electronic device corresponding to the selected object is transmitted (S1155).

The controller 170 may perform control so that the content stored in the selected user or the selected electronic device among various users or electronic devices on the network is transmitted. Various methods of selecting a user or an electronic device may be used by an input of the user. Hereinafter, a drag and drop method will be described.

Figure 20:
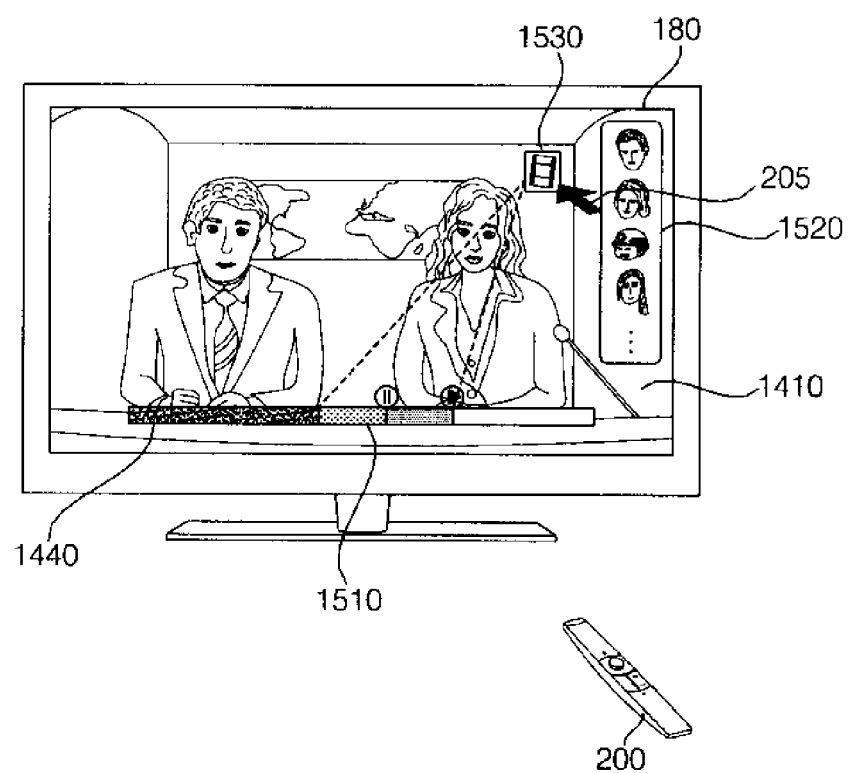

FIG. 20 illustrates that the object 1510 indicating the content stored in the object 1440 indicating that a portion of a broadcasting image is stored is dragged using the pointer 205 of the remote controlling apparatus 200. At this time, the object 1510 indicating the stored content may be displayed by an additional object 1530 when the object 1510 is dragged. In the drawing, since the stored content is a broadcasting image, an object indicating an image is illustrated.

Figure 21:
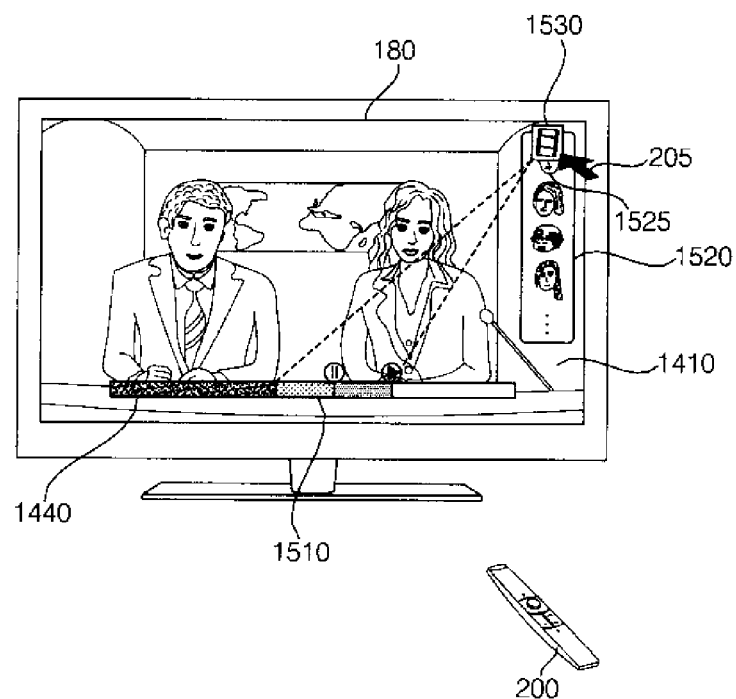

FIG. 21 illustrates that the object 1530 is dropped to a user object 1525 in the object 1520 indicating the users who access the network using the pointer 205 of the remote controlling apparatus 200. Therefore, a specific user may be selected from the other users and the stored content is transmitted to the corresponding user or the electronic device used by the corresponding user.

Figure 22:
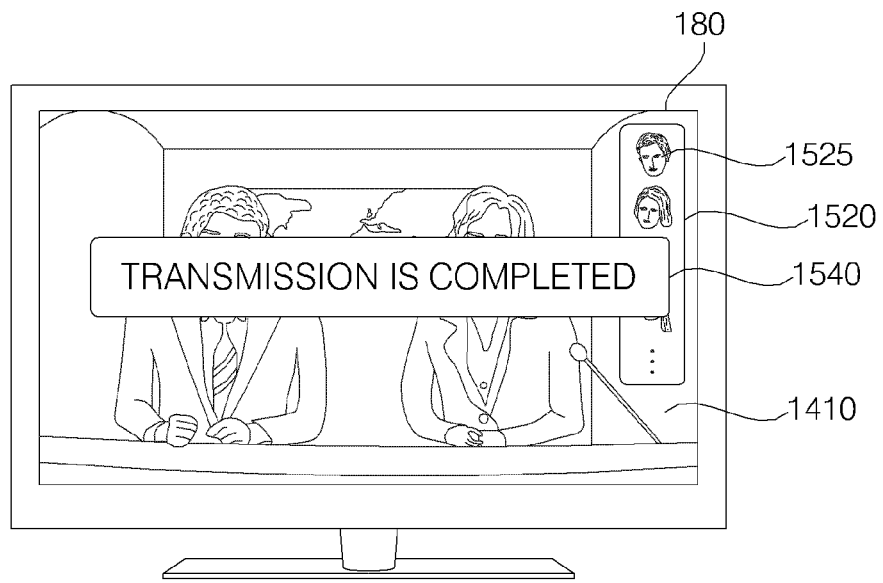

FIG. 22 illustrates that an object 1540 indicating that transmission of the stored content is completed is displayed. Therefore, a user may easily recognize that the transmission is completed.

On the other hand, various examples are available in the above-described transmission step S1155.

FIG. 12 illustrates an example of the transmission step S1155.

First, the network access state of the selected user or the selected electronic device is determined (S1210).

The controller 170 may determine the network access state of the user or the electronic device accessed to the network. For example, predetermined data is transmitted to the user or the electronic device accessed to the network and the transmitted data is received again to grasp the access state of the corresponding user or the corresponding electronic device.

Figure 23:
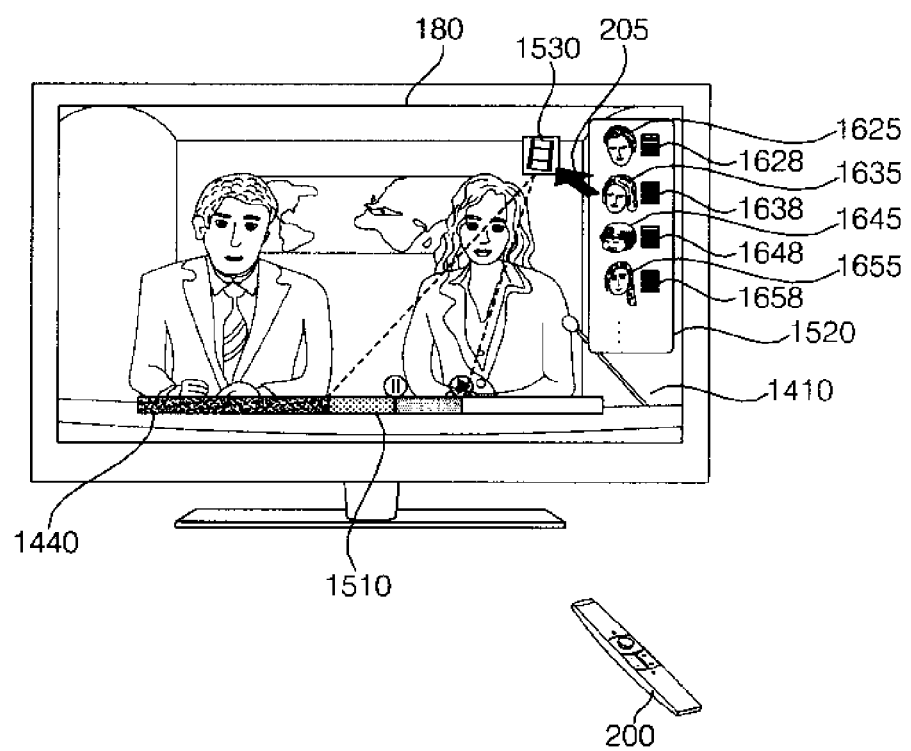

FIG. 23 illustrates the object 1520 indicating the users who access the network. In particular, information on determining the network access states may be also displayed.

That is, as illustrated in the drawing, the object 1520 may include user objects 1625, 1635, 1645, and 1655 and user access state information items 1628, 1638, 1648, and 1658. The access state information items 1628, 1638, 1648, and 1658 indicate that the access states of the second user 1635 and the fourth user 1655 are best and that the access state of the first user 1625 is worst. The access state information items may have various modifications unlike in the drawing.

The data amount of the corresponding content is changed in accordance with the determined network access sate or the data amount of the stored content (S1220). The content data whose amount is changed is transmitted to the selected user or the selected electronic device (S1230).

The controller 170 may change the data amount of the corresponding content in accordance with the data amount of the stored content. For example, when the access sate is not good, the amount of the corresponding content data may be reduced. In addition, when the amount of the stored content data is remarkably large, the amount of the corresponding content data may be reduced.

Various methods of changing resolution, an image encoding method, and a stored content period may be performed in the case of an image and a method for changing volume may be performed in the case of audio data in order to change the data amount.

Figure 24:
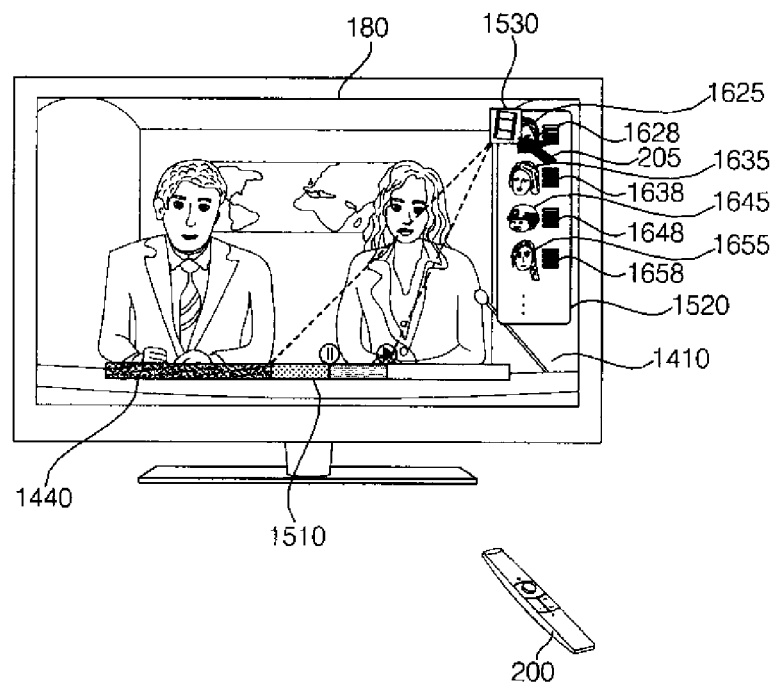

FIG. 24 illustrates that the object 1530 is dropped to one user object 1625 in the object 1520 indicating the users who access the network. At this time, the object 1520 includes the user objects 1625, 1635, 1645, and 1655 and user access state information items 1628, 1638, 1648, and 1658.

Figure 25:
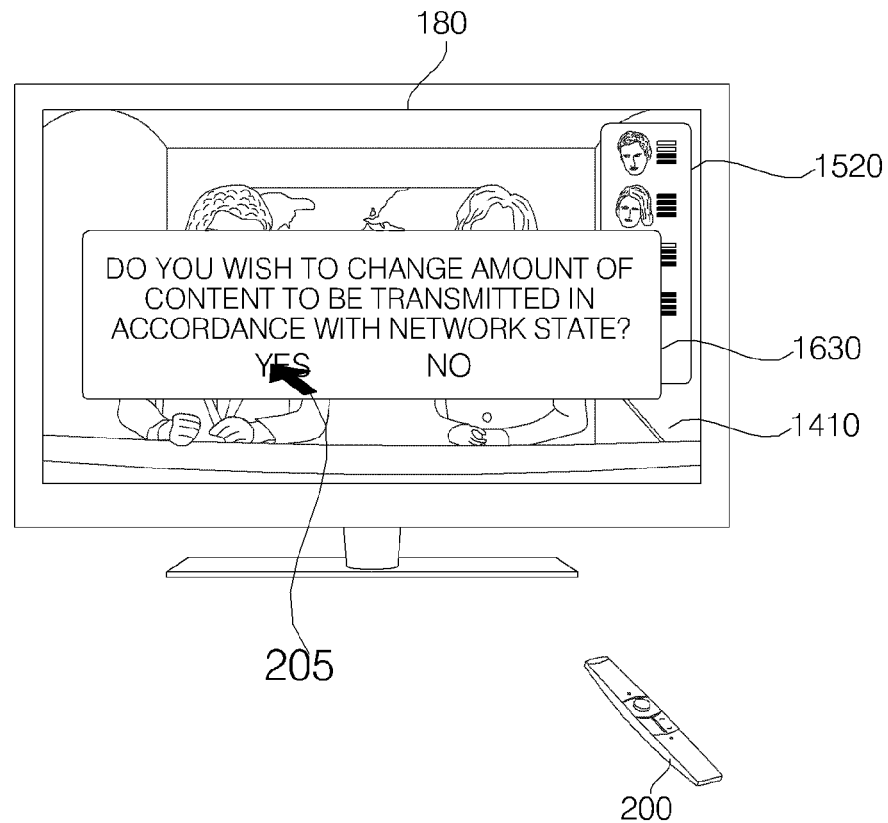

The controller 170 may display an object 1630 indicating whether the amount of the transmitted content is to be changed in accordance with the network state as illustrated in FIG. 25 when the first user 1628 whose access state is not good is selected.

When the user selects to change the data amount using the pointer 205 of the remote controlling apparatus 200, the data amount of the corresponding content is reduced so that the content data whose amount is changed may be transmitted to the selected user or the electronic device used by the selected user. Therefore, the content data may be efficiently transmitted.

Figure 26:
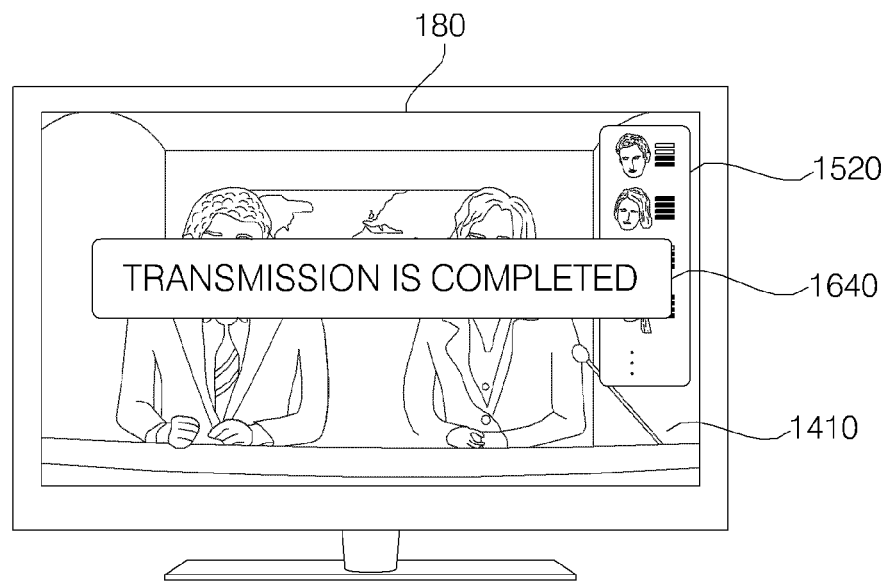

On the other hand, FIG. 26 illustrates that an object 1640 indicating that the transmission of the content data whose amount is changed is completed. Therefore, the user may easily recognize the completion of the transmission.

On the other hand, it is possible to automatically change the amount of the content data and to transmit the content data without informing the user that the amount of the content data is changed as illustrated in FIG. 25.

FIG. 13 illustrates another example of the transmission step (S1155).

First, the controller 170 generates a thumbnail image indicating the stored content. For example, the controller 170 extracts a portion of the image frame of the stored content and performs scaling (for example, downscaling) on the extracted image frame to generate the thumbnail image. The thumbnail image may include at least one image. For example, a plurality of thumbnail images may be extracted from an image frame in various sections in the stored content.

Next, the thumbnail image is transmitted to the selected user or the selected electronic device (S1310).

FIG. 32A illustrates that the object 1530 is dropped to one user object 1525 of the object 1520 indicating the users who access the network using the pointer 205 of the remote controlling apparatus 200. Therefore, when the content data is transmitted, a previously generated thumbnail image 1810 is transmitted to the selected first user or the electronic device used by the first user through a network 1800.

Next, a request to transmit the corresponding content is received from the selected user or the selected electronic device (S1320).

The controller 170 receives transmission request signaling 1820 of the corresponding content from the selected first user or the electronic device used by the first user through the network 1800. In FIG. 32B, the transmission request signaling is illustrated as "Ok signal". However, various examples are available.

Next, in accordance with the transmission request, the stored content is transmitted to the selected user or the selected electronic device (S1330).

The controller 170 transmits stored content data 1830 to the selected first user or the electronic device used by the first user through the network 1800 as illustrated in FIG. 32C after receiving the transmission request signaling 1820 of the corresponding content. Therefore, the stored content data may be transmitted considering whether the other users receive contents.

On the other hand, it is possible to select content desired by the user from the previously stored content list to transmit the selected content as well as to store content data that is being replayed and to transmit the stored content data to the other users or the other electronic devices on the network.

Figure 27:
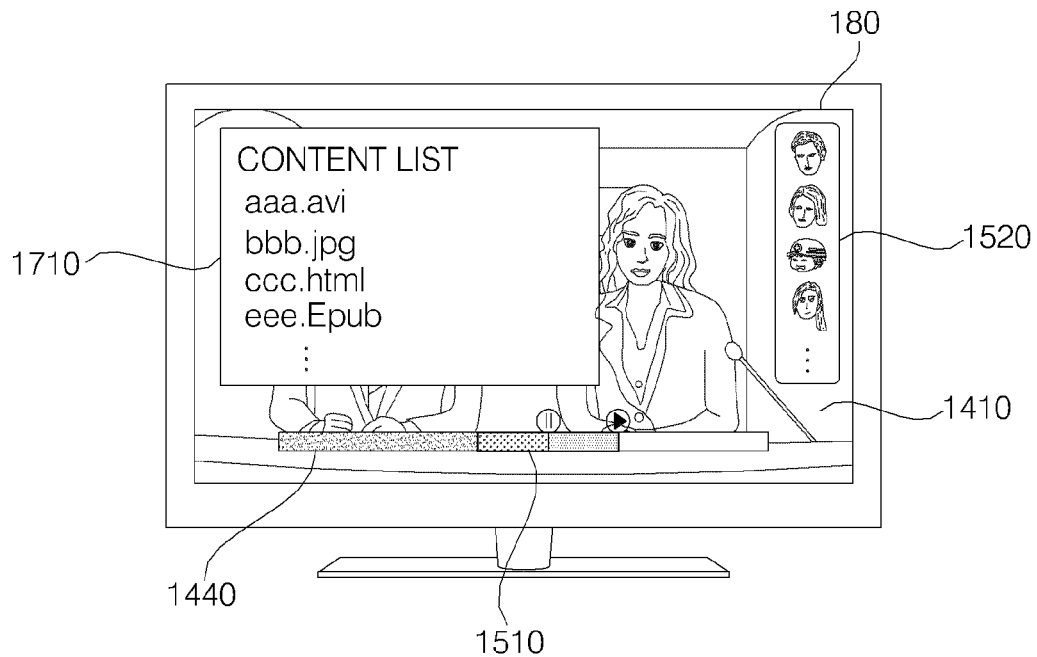

FIG. 27 illustrates that a content list 1710 is displayed in a state where the broadcasting image 1410 is displayed and a portion of the corresponding broadcasting image is stored so that the objects 1440 and 1510 indicating that a portion of the corresponding broadcasting image is stored are displayed. The content list 1710 may be displayed by a content list watch command of the user.

The content list 1710 may include a moving picture file (whose extension is avi), a still image file (whose extension is jpg), a web document file (whose extension is html), and an e-book file (whose extension is Epub). The content list 1710 may be a content list in the image display device 100, a content list in an external device connected to the image display device 100, or a content list on a predetermined network accessed to the network.

On the other hand, the object 1520 indicating the users who access the network may be further displayed on the display unit 180.

Figure 28:
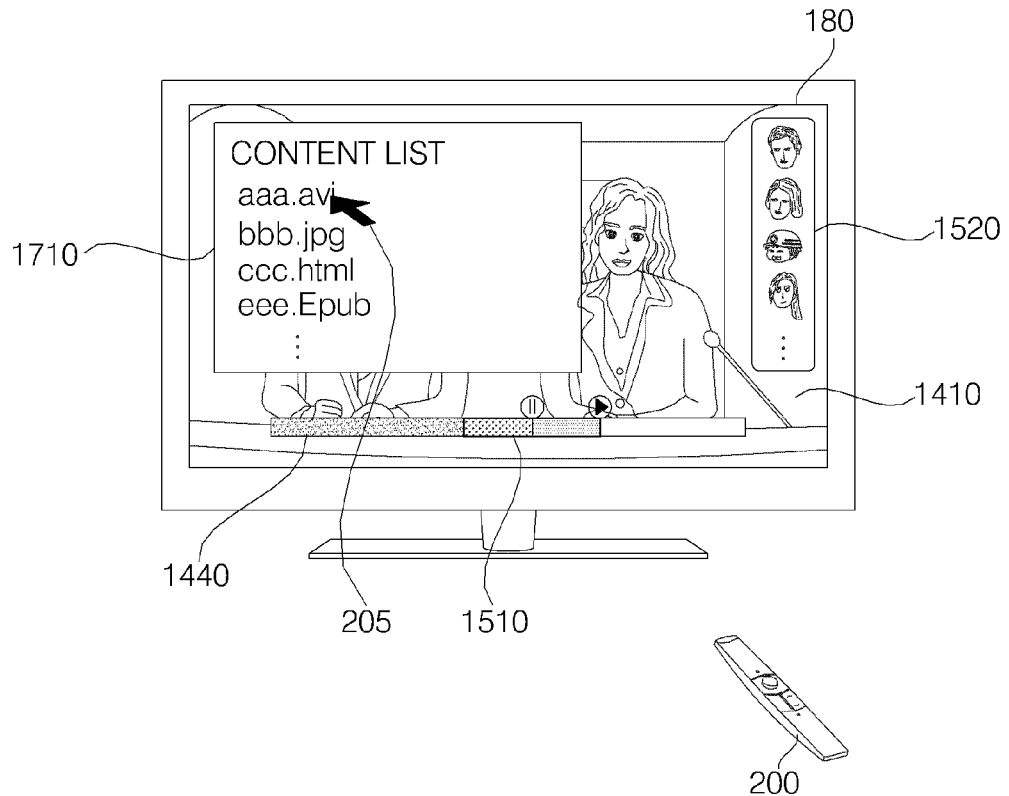

Next, the user may select one from the content list using the pointer 205 of the remote controlling apparatus 200 as illustrated in FIG. 28.

Figure 29:
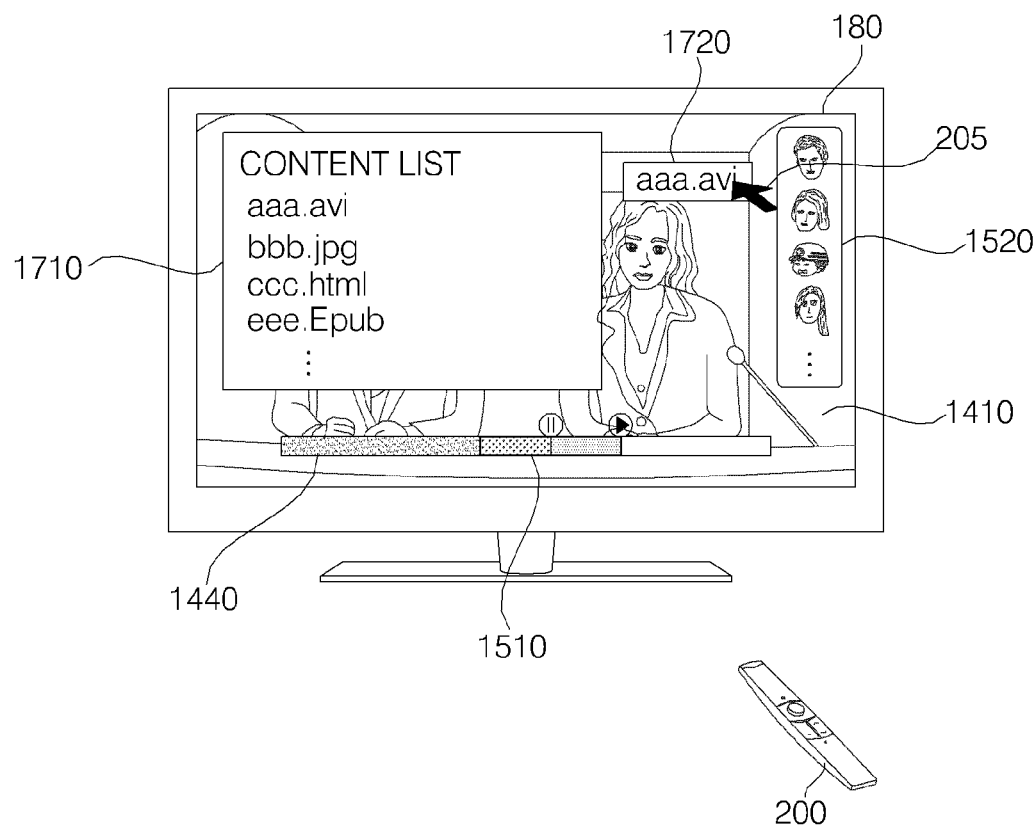

FIG. 29 illustrates that selected content is dragged using the pointer 205 of the remote controlling apparatus 200. At this time, the selected content may be displayed by an additional object 1720 when the selected content is dragged. In the drawing, an object indicating a file name is used as the object 1720. However, various examples such as an object in accordance with the kind of a file are available.

Figure 30:
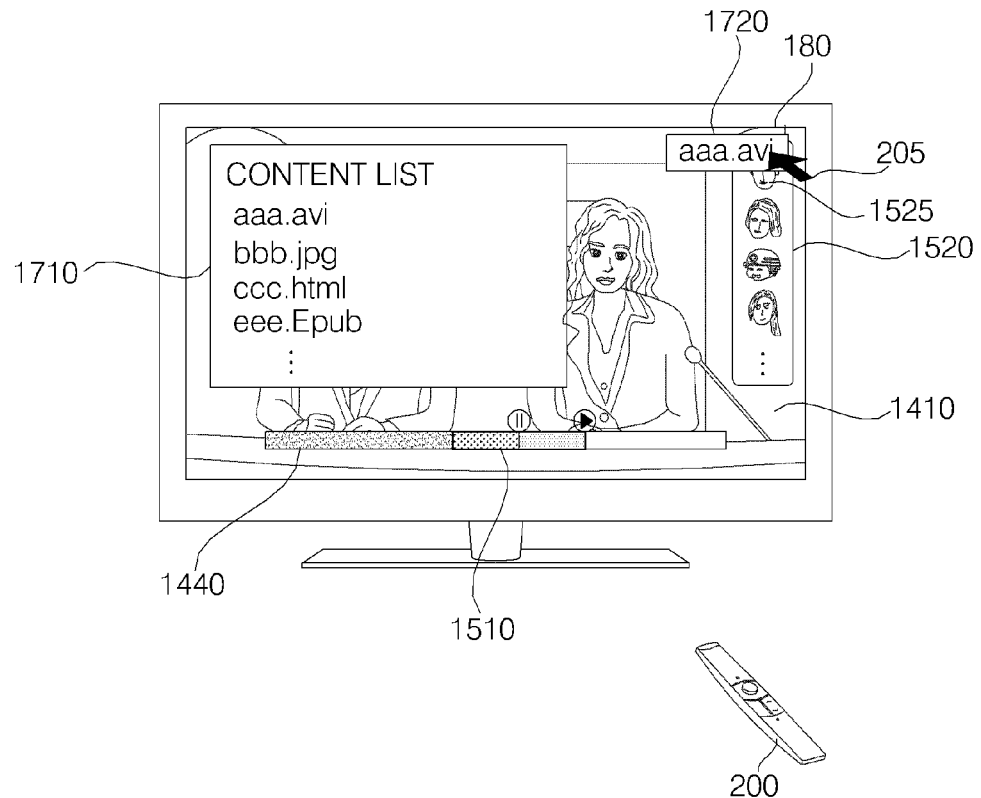

FIG. 30 illustrates that the object 1720 is dropped to one user object 1525 of the object 1520 indicating the users who access the network using the pointer 205 of the remote controlling apparatus 200. Therefore, a specific user may be selected from the other users and selected content (aaa.avi) is transmitted to the corresponding user or the electronic device used by the corresponding user.

Figure 31:
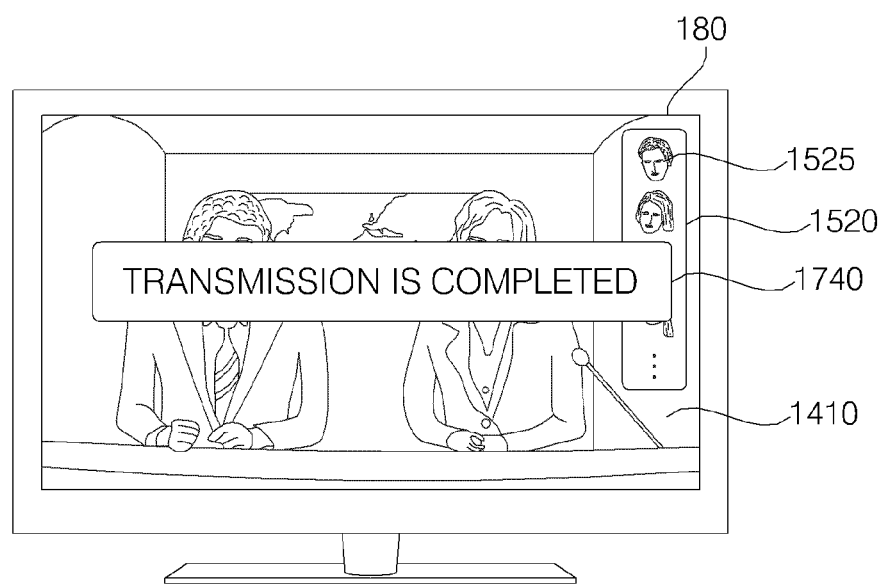
Figure 32:
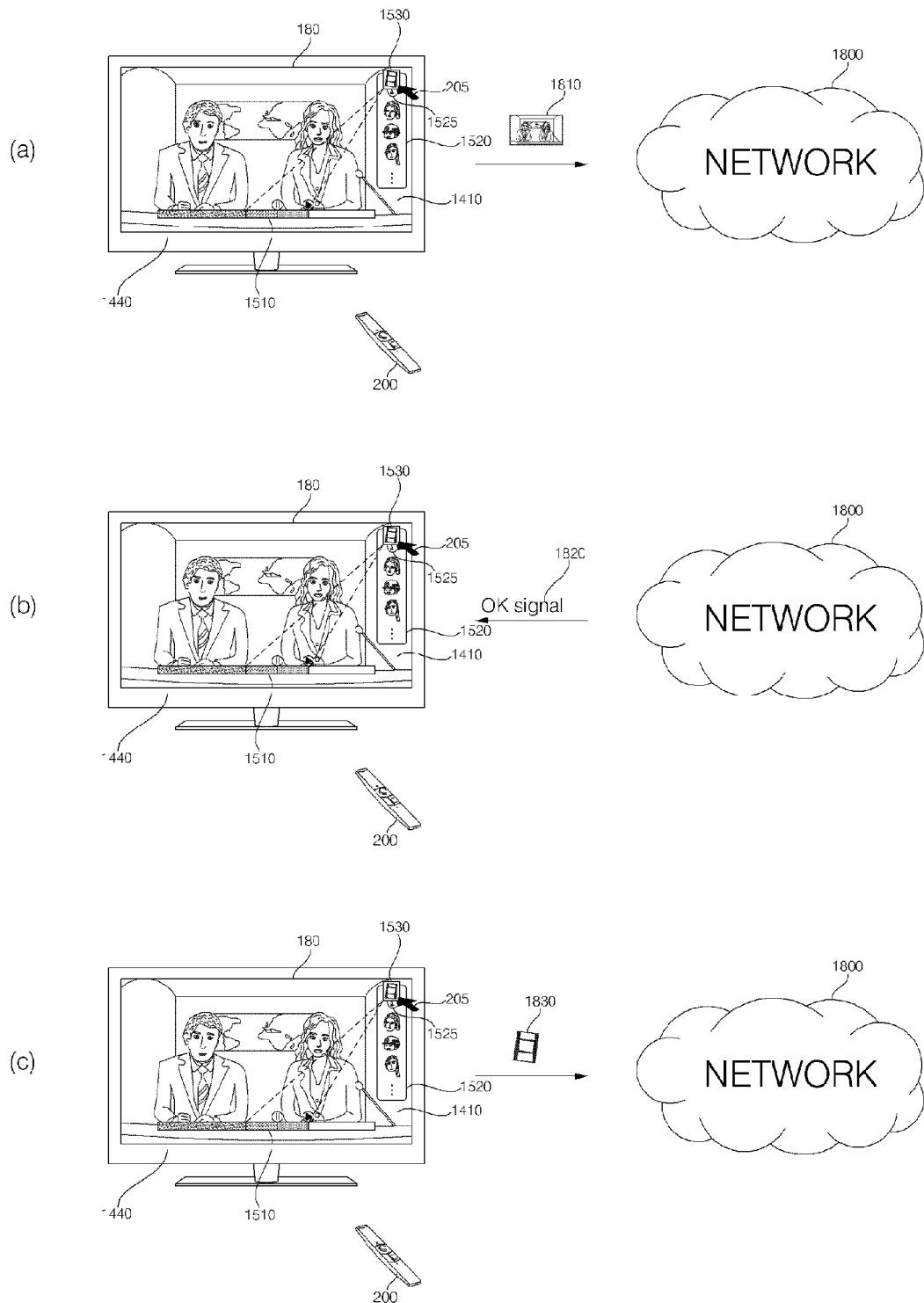

FIG. 31 illustrates that an object 1740 indicating that the transmission of the selected content (aaa.avi) is completed is displayed. Therefore, the user may easily recognize the completion of the transmission.

On the other hand, when content selected from the content list is transmitted, as illustrated in FIG. 16, the data amount of the corresponding data may be changed in accordance with the network access sate to transmit the content whose data amount is changed.

On the other hand, various contents as well as a moving picture such as the above-described broadcasting image may be transmitted. For example, when an audio file, a web document, and an e-book document are replayed, a portion of the above may be stored and the stored content may be transmitted to the other users or the other electronic devices accessed to the network. Hereinafter, storage and transmission during the replaying of the audio file, the web document, and the e-book document will be described.

FIG. 33 illustrates that the audio file is replayed and that a screen 1910 indicating that the audio file is replayed is displayed on the display unit 180. At this time, as described above, an object 1905 indicating that a partial section of the audio file that is being replayed is stored may be displayed. In particular, an object 1915 indicating stored audio data may be displayed. The object 1915 indicating the stored audio data may further include an object indicating that audio before a predetermined period is stored at a corresponding command point as well as an object indicating the amount of audio data stored from the start of a content storage command to the end of the content storage command. Such a function of automatically storing a predetermined section before an audio storage command for the case in which the user missed the storage point of a desired section may be selectively performed.

On the other hand, as illustrated in FIG. 33, the object 1520 indicating the users who access the network may be further displayed on the display unit 180.

As illustrated in FIG. 33, the user may drag the stored audio data using the pointer 205 of the remote controlling apparatus 200. At this time, the stored audio data may be displayed by an additional object 1930 when the stored audio data is dragged. In the drawing, an object indicating audio is used as the object 1930. However, various examples are available.

Figure 34:
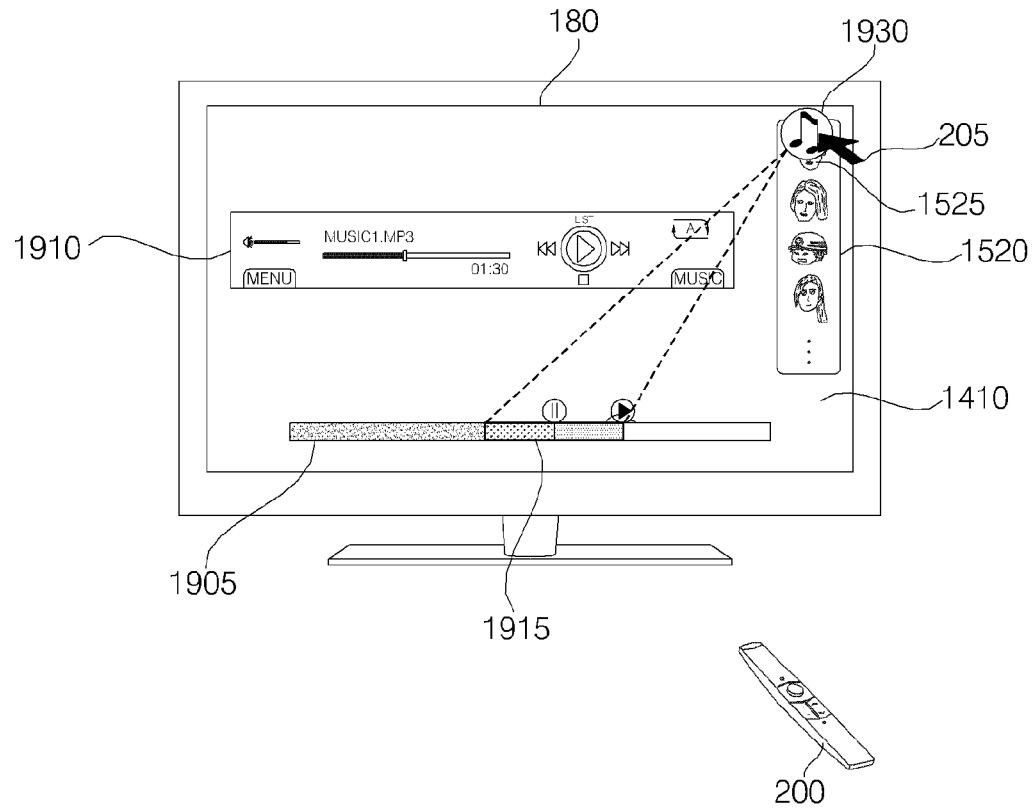

FIG. 34 illustrates that an object 1930 is dropped to one user object 1525 of the object 1520 indicating the users who access the network using the pointer 205 of the remote controlling apparatus 200. Therefore, a specific user may be selected from the other users and the stored audio data is transmitted to the corresponding user or the electronic device used by the corresponding user.

Figure 36:
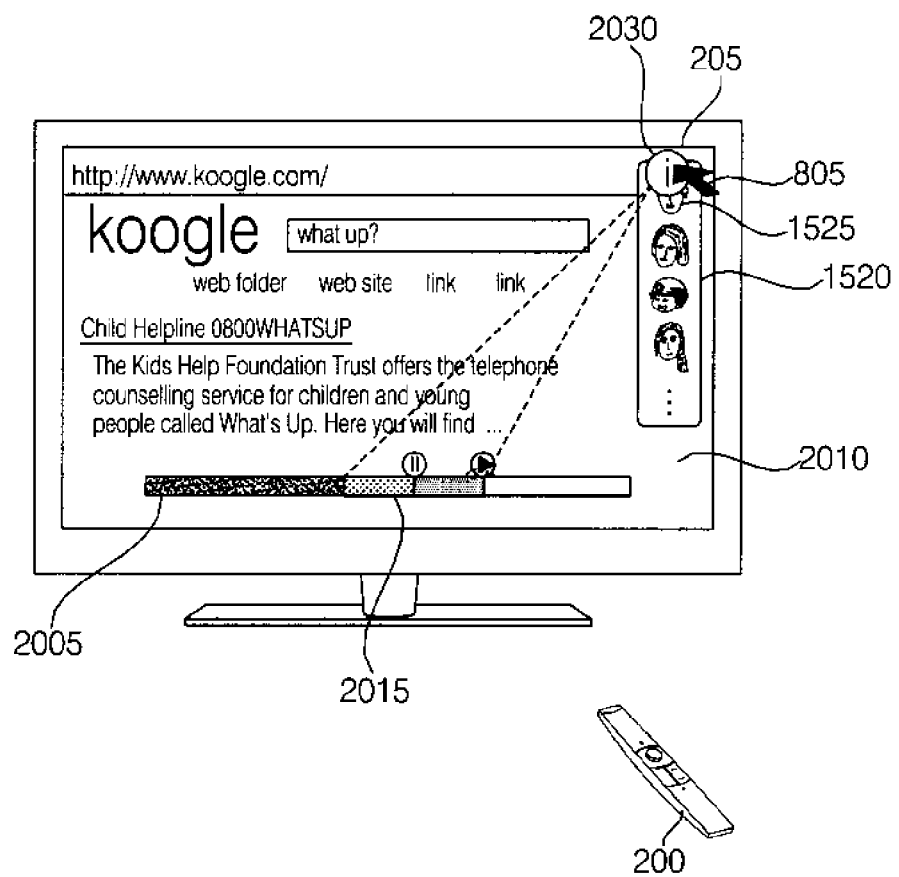

FIGS. 35 and 36 are similar to FIGS. 33 and 34, however, are different from FIGS. 33 and 34 in that the web document is used instead of the audio file. Hereinafter, FIGS. 35 and 36 will be described based on the difference.

As illustrated in FIG. 35, in a state where a screen 2010 indicating the accessed web page is displayed on the display unit 180, the object 1520 indicating the users who access the network may be displayed. On the other hand, when the user searches various web pages other than the corresponding web page, as described above, an object 2005 indicating that partial section of the various web pages that are being searched is stored may be displayed. In particular, an object 2015 indicating a stored web page may be displayed. The object 2015 indicating the stored web page may further include an object indicating that the web page before a predetermined period from the corresponding command point is stored as well as an object indicating the amount of the web page stored from the start of a content storage command to the end of the content storage command. Such a function of automatically storing a predetermined section before the web page storage command for the case in which the user missed the storage point of a desired section may be selectively performed.

As illustrated in FIG. 35, the user may drag the stored web page data using the pointer 205 of the remote controlling apparatus 200. At this time, an additional object 2030 may be displayed when the stored web page data is dragged. In the drawing, an object indicating the Internet is used as the object 2030. However, various examples are available.

FIG. 36 illustrates that the object 2030 is dropped to one user object 1525 of the object 1520 indicating the users who access the network using the pointer 205 of the remote controlling apparatus 200. Therefore, a specific user may be selected from the other users and the stored web page data is transmitted to the corresponding user or the electronic device used by the corresponding user.

Figure 38:
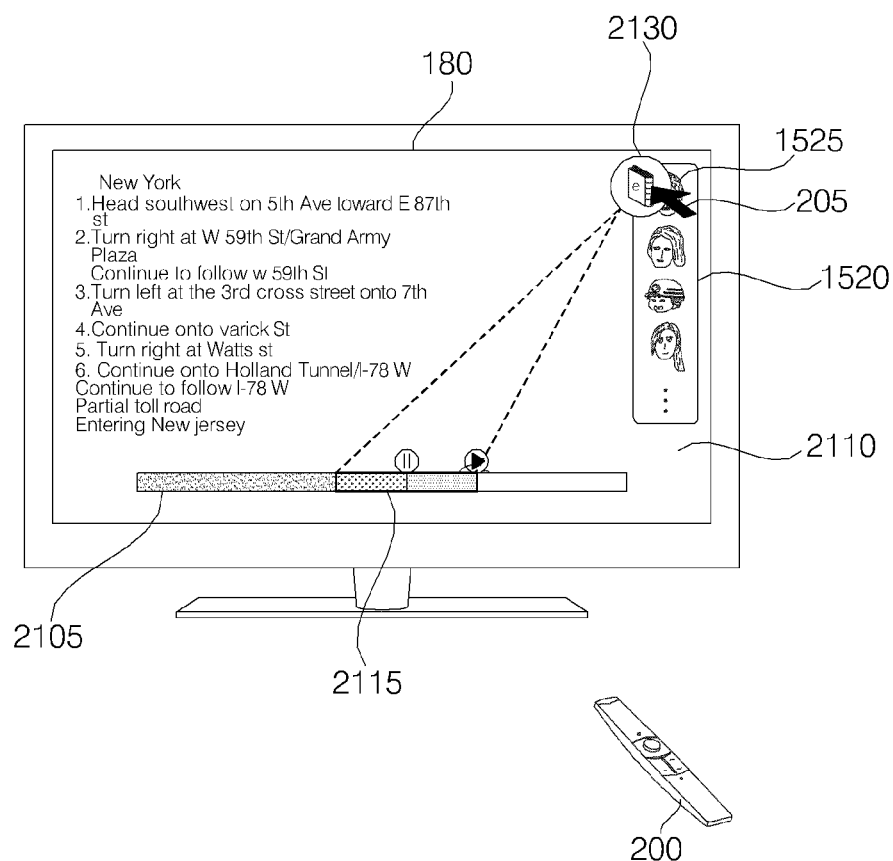

FIGS. 37 and 38 are similar to FIGS. 33 and 34, however, are different from FIGS. 33 and 34 in that the electronic document file is used instead of the audio file. Hereinafter, FIGS. 37 and 38 will be described based on the difference.

As illustrated in FIG. 37, in a state where a screen 2110 indicating the electronic document that is being replayed is displayed on the display unit 180, the object 1520 indicating the users who access the network may be displayed. On the other hand, when the user searches various electronic document pages other than the corresponding electronic document page, as described above, an object 2105 indicating that partial section of the various electronic document pages that are being searched is stored may be displayed. In particular, an object 2115 indicating a stored electronic document page may be displayed. The object 2115 indicating the stored electronic document page may further include an object indicating that the electronic document page before a predetermined period from the corresponding command point is stored as well as an object indicating the amount of the electronic document page stored from the start of a content storage command to the end of the content storage command. Such a function of automatically storing a predetermined section before the electronic document page storage command for the case in which the user missed the storage point of a desired section may be selectively performed.

As illustrated in FIG. 37, the user may drag the stored electronic document page data using the pointer 205 of the remote controlling apparatus 200. At this time, an additional object 2130 may be displayed when the stored electronic document page data is dragged. In the drawing, an object indicating the electronic document is used as the object 2130. However, various examples are available.

FIG. 38 illustrates that the object 2130 is dropped to one user object 1525 of the object 1520 indicating the users who access the network using the pointer 205 of the remote controlling apparatus 200. Therefore, a specific user may be selected from the other users and the stored electronic document page data is transmitted to the corresponding user or the electronic device used by the corresponding user.

The image display device and the method for operating the same according to the present invention are not limited to the structure and method for the above-described embodiments but all or parts of the embodiment are selectively combined with each other to form various modifications.

On the other hand, the method for operating the image display device according to the present invention may be realized in recording media that may be read by the processor included in the image display device by a code that may be read by the processor. The recording media that may be read by the processor include all the kinds of recording apparatuses in which data that may be read by the processor is stored. The recording media that may be read by the processor include an ROM, an RAM, a CD-ROM, a magnetic tape, a floppy disk, and an optical data storage device. In addition, carrier wave such as transmission through the Internet is provided. In addition, the recording media that may be read by the processor are diffused into a computer system accessed to the network so that the code that may be read by the processor may be stored and executed by a diffusion method.

While the present invention has been shown and described in connection with the embodiments, it will be apparent to those skilled in the art that modifications and variations can be made without departing from the spirit and scope of the invention as defined by the appended claims.

The invention claimed is:

1. A method for operating an image display device, the method comprising:
    replaying content;
    storing at least one portion of the replayed content when a storage command on the replayed content exists;
    displaying the replayed content with a content object indicating the stored at least one portion of the content, the content object including an object indicating an amount of the at least one portion of the content stored from a start of the content storage command to an end of the content storage command or a current point;
    displaying the replayed content and the content object with an object indicating other users or other electronic devices of an accessed network or other networks linked to the accessed network; and
    transmitting the stored at least one portion of the content to a selected user or a selected electronic device corresponding to a specific object when the content object is dragged and dropped to the specific object selected from among a plurality of objects indicating the other users or the other electronic devices.

2. The method of claim 1, wherein transmitting the stored at least one portion of the content comprises:
    determining a network access state of the selected user or the selected electronic device;
    changing a data amount of corresponding content in accordance with the network access state or a data amount of the stored at least one portion of the content; and
    transmitting the corresponding content with the changed amount of data to the selected user or the selected electronic device.

3. The method of claim 1, further comprising generating a thumbnail image indicating the stored at least one portion of the content,
    wherein transmitting the stored at least one portion of the content comprises:
    transmitting the thumbnail image to the selected user or the selected electronic device; and
    receiving a request to transmit corresponding content from the selected user or the selected electronic device, and
    wherein the stored at least one portion of the content is transmitted to the selected user or the selected electronic device in accordance with the transmission request.

4. The method of claim 1, further comprising:
    displaying a stored content list; and
    selecting one content from the stored content list,
    wherein, in transmitting the stored at least one portion of the content, the selected content is transmitted to the selected user or the selected electronic device.

5. The method of claim 1, further comprising displaying an image related to the replayed content.

6. The method of claim 1, further comprising:
    displaying an application object indicating applications stored in the image display device,
    wherein storing the at least one portion of the replayed content is performed when an object indicating content storage is selected from the application object.

7. The method of claim 1, wherein the content object further indicates content data replayed and stored prior to the storage command.

8. The method of claim 1, further comprising terminating the storing of the at least one portion of the content when a shutdown command is received during the storing of the at least one portion of the content.

9. The method of claim 1, further comprising:
generating and displaying a new object that is different from the content object when the content object is dragged such that the new object is movable according to the dragging while the content object is displayed at a same position during the dragging such that the stored at least one portion of the content is transmitted to the selected user or the selected electronic device when the new object moved according to the dragging is dropped to the specific object.

10. The method of claim 9, wherein a shape of the new object is changed based on a type of the content associated with the new object.

11. An image display device, comprising:
a display unit configured to display replayed content;
a network interface unit configured to transmit data to or receiving data from a network;
a storage unit configured to store at least one portion of the replayed content when a content storage command exists; and
a controller configured to:
control the display unit to display the replayed content with a content object indicating the stored at least one portion of the content, the content object including an object indicating an amount of the at least one portion of the content stored from a start of the content storage command to an end of the content storage command or a current point;
control the display unit to display the replayed content and the content object with an object indicating other users or other electronic devices of an accessed network or other networks linked to the accessed network; and
control the display unit to transmit the stored at least one portion of the content to a selected user or a selected electronic device corresponding to a specific object when the content object is dragged and dropped to the specific object selected from among a plurality of objects indicating the other users or the other electronic devices.

12. The image display device of claim 11, wherein the controller is further configured to:
determine a network access state of the selected user or the selected electronic device;
change a data amount of corresponding content in accordance with the network access state or a data amount of the stored at least one portion of the content; and
cause the network interface unit to transmit the corresponding content with the changed amount of data to the selected user or the selected electronic device.

13. The image display device of claim 11, wherein the controller is further configured to:
generate a thumbnail image indicating the stored at least one portion of the content; cause the network interface unit to transmit the thumbnail image to the selected user or the selected electronic device when the stored at least one portion of the content is transmitted;
cause the network interface unit to receive a request to transmit corresponding content from the selected user or the selected electronic device; and
cause the network interface unit to transmit the stored at least one content of the content to the selected user or the selected electronic device.

14. The image display device of claim 11, wherein the controller is further configured to:
control the display unit to display a stored content list; and
cause the network interface unit to transmit one stored content selected from the content list to the selected user or the selected electronic device.

15. The image display device of claim 11, wherein the controller is further configured to control the display unit to display an application object indicating applications stored in the image display device; and
control the storage unit to store the at least one portion of the replayed content when an object indicating content storage is selected from the application object.

16. The image display device of claim 11, wherein the storage unit is further configured to store content data replayed prior to the storage command and the content object further indicates content data replayed and stored prior to the storage command.

17. The image display device of claim 11, wherein the controller is further configured to control the display unit to display applications that are stored in the image display device or that may be downloaded from an external apparatus or an external network when an application display command exists.

18. The image display device of claim 15, further comprising:
a user input interface unit configured to receive a control signal from a remote controlling apparatus to process the received control signal; and
a platform configured to transmit or receive data through the network according to the control signal received from the remote controlling apparatus,
wherein the platform comprises:
an operating system (OSS kernel; and
an application driven on the OS kernel, and
wherein the application comprises applications that are downloadable via the network to be provided or deleted.

19. The image display device of claim 11, wherein the controller is further configured to:
generate a new that is different from the content object when the content object is dragged;
control the display unit to display the new object that is movable according to the dragging;
control the display unit to display the content object at a same position during the dragging; and
control the network interface unit to transmit the stored at least one portion of the content to the selected user or the selected electronic device when the new object moved according to the dragging is dropped to the specific object.

20. The image display device of claim 19, wherein a shape of the new object is changed based on a type of the content associated with the new object.

* * * * *